US005896321A

United States Patent [19]
Miller et al.

[11] Patent Number: 5,896,321
[45] Date of Patent: Apr. 20, 1999

[54] TEXT COMPLETION SYSTEM FOR A MINIATURE COMPUTER

[75] Inventors: John W. Miller, Kirkland; Jossef Goldberg, Seattle, both of Wash.

[73] Assignee: Microsoft Corporation, Redmond, Wash.

[21] Appl. No.: 08/970,310

[22] Filed: Nov. 14, 1997

[51] Int. Cl.$^6$ .................................................. G11C 13/00
[52] U.S. Cl. .............................. 365/189.01; 365/230.01; 365/230.03
[58] Field of Search ................... 365/189.01, 230.01, 365/230.03

[56] References Cited

U.S. PATENT DOCUMENTS

| | | |
|---|---|---|
| 4,558,302 | 12/1985 | Welch . |
| 4,791,587 | 12/1988 | Doi ..................................... 365/189.01 |
| 4,814,746 | 3/1989 | Miller et al. . |
| 4,955,066 | 9/1990 | Notenboom . |
| 4,969,097 | 11/1990 | Levin . |
| 5,109,433 | 4/1992 | Notenboom . |
| 5,261,091 | 11/1993 | Yuyama . |
| 5,367,453 | 11/1994 | Capps et al. . |

OTHER PUBLICATIONS

Harrison, Malcolm C., "Implementation of the Substring Test by Hashing," in *Communications of the ACM*, Dec. 1971, vol. 14, No. 12, pp. 777–779.

McCreight, Edward M., "A Space–Economical Suffix Tree Construction Algorithm," in *Journal of the Association for Computing Machinery*, Apr. 1976, vol. 23, No. 2, pp. 262–272.

"Programmer's Reference, vol. 1: Overview," for the Microsoft Windows Operating System, for Microsoft Windows Version 3.1, by Microsoft Corporation. U.S. Patent No. 4,974,159.

*Primary Examiner*—Terrell W. Fears
*Attorney, Agent, or Firm*—Jones & Askew, LLP

[57] ABSTRACT

A text completion system that automatically displays a list of completion suggestions for a partial data entry in response to a pause in receipt of the data entry. To avoid annoying the user by displaying an excessive number of wrong suggestions, the text completion system applies search criteria to the partial data entry. If the partial data entry satisfies the search criteria, the text completion system obtains a prioritized list of word predictions for the partial data entry from a word prediction system. To further avoid annoying the user by displaying very short completion suggestions, the text completion system applies display criteria to the word predictions to obtain a prioritized list of completion suggestions that satisfy the display criteria. This prioritized list of completion suggestions is then displayed in a pop-up list box, typically immediately under and to the right of the partial data entry. The completion suggestions are positioned in the list based on a computed indication of likelihood of being correct. The user may accept a completion suggestion from the list by touching a stylus to the display screen over the position of the desired completion suggestion, or by using traditional selection and acceptance keystrokes, such as the "arrow" keys to select a completion suggestion and the "enter" key to accept the selected completion suggestion. Thus, the text completion system allows the user to complete the partial data entry without having to type the remaining letters of the complete data entry.

35 Claims, 10 Drawing Sheets

TEXT COMPLETION SYSTEM FOR A MINIATURE COMPUTER

TECHNICAL FIELD

This invention relates generally to the field of data entry systems and, more particularly, to a text completion system for a miniature computer.

BACKGROUND OF THE INVENTION

Miniature computers, commonly known as "hand-held computers" and "personal digital assistants," are becoming increasingly powerful and popular. The user interface included with one of these miniature computers typically includes a small "QWERTY" keyboard, a stylus, and a small touch-sensitive display screen, such as a liquid-crystal display (LCD). The size and speed of basic computer components has improved to the point where miniature computers can now perform many of the text-based functions, such as word processing, e-mail, spreadsheets, personal calendars, and the like that previously required a full-size desktop or laptop computer.

To use a miniature computer for one of these text-based functions, a user typically types on a keyboard to enter text and commands into an active data file, which is open within a host application program running on the computer. Other text input devices may include a voice recognition interface, a touch-sensitive screen that displays a graphical image of a keyboard, and a system that detects the motion of a stylus in combination with handwriting recognition software. The text and commands are then interpreted and manipulated by the host application program in accordance with the syntax and functionality implemented by the host application program.

For many users, the most time consuming computer activity is the entry of large amounts of text into various data files, such as word processing files, personal calendar files, e-mail files, and so forth. Regardless of the input method used, the speed at which the text can be entered into the computer is a major factor governing the user's efficiency. Entering text into a miniature computer can be particularly cumbersome using the small keyboards included with miniature computers. This is because the key size on this type of keyboard is so small that using one's finger to select a key runs a substantial risk of contacting one or more unintended keys. This sort of text entry error can slow text entry and frustrate the user.

Accordingly, effective text-input aids are important attributes for miniature computers. Due to space limitations, however, miniature computers typically carry significantly less computer storage, random-access memory, and processing capacity than their desktop and laptop cousins. In general, because processing speed and memory storage are more restricted for miniature computers, special attention must be given to these aspects of program design. As a result, text-input aids that are feasible to deploy on desktop and laptop computers may not be feasible to deploy on miniature computers. Text-input aids for miniature computers must therefore be designed in light of these relatively severe processing speed and memory-use constraints.

The designers of text-intensive application programs for conventional desktop and laptop computers have developed text-input aids to assist users in entering text into these computers. Although these text-input aids may not be directly applicable to miniature computers, they are generally instructive of the design techniques and considerations often associated with text-input aids. More specifically, the text-input aids developed for conventional desktop and laptop computers may be adapted for use in a miniature computer by modifying the text-input aids to operate with acceptable performance characteristics in view of the relatively severe processing speed and memory-use constraints encountered with the miniature computer.

A text completion system is a type of text-input aid that has been successfully deployed for conventional desktop and laptop computers. Generally stated, a text completion system predicts and suggests complete data entries based on partial data entries. This allows the user to type in a partial data entry and then accept a predicted text completion with a single keystroke, thus avoiding the keystrokes that would have been required to type the complete data entry. For example, a text prediction system may be configured to recognize a user's name so that the user's complete name, "Jossef Goldberg" for instance, may be predicted after the user types the first few letters, "Jos" in this example.

Because there are a limited number of words available in any given language, many of the words forming the vocabulary of the language are used frequently. This is particularly true for data files that include structured fields for certain data entries, such as the "from" and "to" fields of an e-mail message, and the "payee" and "amount" fields of a bank check. A structured field supplies a context for data to be entered into the field. This context can be used to limit the choice of text predictions for the field, and increase the likelihood that a suggested text completion will be correct. Text prediction systems therefore work well for structured data fields because the choice of words used in a particular structured field can often be sufficiently limited so that the word prediction system can offer reasonably likely suggestions within acceptable memory-use and performance characteristics.

Most-recently-used (MRU) text completion methods have also been deployed in connection with structured data fields to speed text entry and also serve as a memory aid for repetitive data entries. These text completion methods use an MRU data list for each structured field to provide a list of predicted text completion choices for the field. That is, a list of the most recent items entered into the structured field is used to predict text completions for partial data entries entered into the field. For example, a personal finance program may maintain a record of a person's previous bank checks. In order to speed entry of the check payee on a new check, the program keeps an MRU list of prior check payees. This MRU list is used to automatically predict a completion for the payee name after the first few letters of the payee have been typed by the user. For instance, if a user has previously written checks to "Georgia Power," the complete data entry "Georgia Power" may be predicted after the letters "Ge" have been typed into the check payee field.

In MRU text completion systems, an input character may be analyzed with respect to the prior history of text entered to predict the text likely to follow the input character or string of characters. Because MRU text prediction systems are based on a prior history of text entered, the search time and amount of storage required for the systems are important parameters. Either a linear or a binary search is typically used to scan the text history in order to predict a text completion. A linear search operates by sequentially examining each element in a list until the target element is found or the list has been completely processed. Because every entry must be analyzed, linear searches are primarily used with very short lists.

A binary search, on the other hand, locates an item by repeatedly dividing an ordered list in half and searching the half that it is known to contain the item. This requires a value for the input that can be compared against values in a list of items arranged in a known sequence, such as ascending numerical order corresponding to lexicographic placement. The binary search begins by comparing the input value against the value in the middle of the list. If the input value is greater than the middle value, the lower half of the list is discarded and the search continues on the upper half. The input value is again compared with a value in the middle of the new list and again half of the list is discarded. The process continues, with the input value being compared against the middle of each succeeding smaller list, until the desired item is found.

Although binary searches can generally be completed relatively quickly if the data to be searched is stored in a format allowing fast random access, both linear and binary searches can require substantial time to complete. This can lead to unacceptable performance when very large search lists must be analyzed. MRU text completion systems therefore tend to be costly in terms of computation resources and performance. Also, without a mechanism for increasing the likelihood of making a correct prediction, such as structured fields in the input data file, the text completion system may make wrong predictions so often that the system may be perceived as more annoying than useful. For this reason, MRU text completion systems have typically been deployed in connection with structured fields.

Restricting the search field using a limited text prediction data space, such as a known data range or naming syntax, is another approach to improving the performance of a text completion system. For example, a spreadsheet program may use the data entries in adjacent rows and columns as a limited data space list for predicting text completion choices when the user is entering a new heading into the spreadsheet. Similarly, an editing program for software development may use a predefined list of valid function and command names as a limited data space for predicting text completion choices when the user is writing a software program. Or a filing system may use the list of previously-created file names as a limited data space for predicting text completion choices when the user is selecting a file. Of course, these limited-data-space text prediction systems only work well when there is a limited and well-defined data space to use for selecting text predictions. They are not well suited to automatic application for all data entries in an unstructured portion of a data file because, in this situation, there is not a readily apparent limited and well-defined data space to use for selecting text prediction choices.

Prior text completion systems have additional shortcomings when deployed in the multiple-application-program environment that exists on most computers systems, including recent generations of miniature computers. These computers allow multiple application programs, such as a word processing program, an e-mail program, and a personal calendar program, to run simultaneously on the computer. User interfaces for the various application programs typically appear in different windows. The user selects one window at a time to receive input, and then inputs text and commands into the selected window using the keyboard or another text input device.

The text completion systems described above are usually deployed on an individual application program basis. That is, each text completion system is typically customized to work only with one particular application program. For example, the check writing text prediction system discussed previously works only with the check writing application program, and not with other application programs, such as a word processing program or e-mail program running on the same computer system. This causes wasteful duplication of software when similar text completion systems are implemented by several different application programs. Duplication of items stored in memory can also result. For example, duplicate items may be stored in memory when several different applications keep separate MRU histories or dictionaries. Another problem is that repetitive data entries cannot be identified across several application programs. As a result, the user may have to "teach" several text completion systems the same set of commonly-used data entries, such as the user's name, address, business name, etc.

As noted previously, all of the difficulties encountered with text completion systems in general are exacerbated in a text completion system for a miniature computer. Thus, there is a general need in the art for a text completion system for use with a miniature computer system having a touch-sensitive display screen and a reduced-size keyboard as primary data entry devices. There is a further need in the art for a text completion system that operates effectively within the restricted processing speed and memory-use characteristics of a miniature computer. There is a further need for an application-independent text completion system that may operate with multiple application programs running on a miniature computer.

SUMMARY OF THE INVENTION

The present invention is a text completion system that automatically displays a prioritized list of completion suggestions for a partial data entry in response to a pause in receipt of the data entry. To avoid annoying the user by displaying an excessive number of wrong suggestions, the text completion system applies search criteria to the partial data entry. If the partial data entry satisfies the search criteria, the text completion system obtains a prioritized list of word predictions for the partial data entry from a word prediction system. To further avoid annoying the user by displaying very short completion suggestions, the text completion system applies display criteria to the word predictions to obtain a prioritized list of completion suggestions that satisfy the display criteria. This prioritized list of completion suggestions is then displayed in association with the partial data entry.

The prioritized list of completion suggestions is typically displayed in a pop-up list box in a non-intrusive manner, such as immediately under and to the right of the partial data entry. The completion suggestions are positioned in the list based on a computed indication of likelihood of being correct. The user may accept a completion suggestion from the list by touching the stylus to the display screen over the position of the desired completion suggestion, or by using traditional selection and acceptance keystrokes, such as the "arrow" keys to select a completion suggestion and the "enter" key to accept the selected completion suggestion. Thus, the text completion system allows the user to complete the partial data entry without having to type the remaining letters of the complete data entry. This saves keystrokes, which is an important attribute in a user interface for a miniature computer having a very small keyboard.

Generally stated, the invention is a text completion system for a miniature computer, such as a hand-held personal computer or a personal digital assistant. The text completion system monitors the entry of a stream of characters into a data file associated with a program module running on a computer system. The stream of characters defines a plurality of complete data entries followed by a partial data entry, which are displayed on a display screen. The text completion system can detect a pause of a predetermined duration in the entry of the stream of characters.

In response to the pause, the text completion system determines whether the partial data entry satisfies search criteria. For example, the text completion system may determine whether the partial data entry satisfies the search criteria by receiving a user command establishing a predetermined number of characters. The text completion system may then determine whether the partial data entry includes at least the predetermined number of characters. If the partial data entry satisfies the search criteria, the text completion system obtains a prioritized list of word predictions for the partial data entry from a word prediction system.

The text completion system applies display criteria to the list of word predictions to obtain a prioritized list of completion suggestions. For example, the text completion system may determine whether the partial data entry satisfies the display criteria by receiving a user command establishing a predetermined number of additional characters. The text completion system then determines whether a particular word prediction includes at least the additional number of characters more than the partial data entry. If there are word completions that satisfy the display criteria and thus qualify as completion suggestions, the text completion system displays the completion suggestions in priority order in association with the partial data entry.

Once the completion suggestions have been displayed, the text completion system may receive an acceptance command associated with a particular one of the completion suggestions. In response to the acceptance command, the text completion system completes the partial data entry with the additional characters of the particular completion suggestion and discontinues the display of the prioritized list of completion suggestions. In addition, before receiving the acceptance command, the text completion system may receive a selection command associated with the particular completion suggestion. This selection command changes the completion suggestion that is selected for acceptance by the user.

According to an aspect of the invention, the word prediction system produces a prioritized list of word predictions by comparing the partial data entry to the entries in a dictionary to obtain a list of feasible words. The word prediction system submits the list of feasible words to a plurality of word prediction experts and obtains a word prediction score for each entry in the list of feasible words from each expert. The word prediction system positions each word prediction in the prioritized list of word predictions based on a computed indication of likelihood of being a correct completion suggestion.

To produce a prioritized list of word predictions, the word prediction system associates each entry in the dictionary with a word identification value. For entries in the list of feasible words, the word prediction system obtains a word prediction score from each word prediction expert and computes a word value based on the word prediction scores and the word identification value. The word prediction system then positions the entry in the prioritized list based on the word value. To simplify the computation of a word value, each word prediction expert may be assigned a mutually exclusive set of bits within the word value structure to reflect a priority order among the word prediction experts. This allows each word value to be computed by summing the word prediction scores for a particular feasible word with the word identification value for the feasible word.

The word prediction system can submit the list of feasible words to a first one of the word prediction experts. The first word prediction expert compares the list of feasible words to a list of recently received words to determine whether a particular feasible word appears in the list of recently received words. If the particular feasible word appears in the list of recently received words, the first word prediction expert determines whether the complete data entry immediately preceding the partial data entry in the stream of characters corresponds to the data entry immediately preceding the particular feasible word in the list of recently received words. If the complete data entry immediately preceding the partial data entry in the stream of characters corresponds to the data entry immediately preceding the particular feasible word in the list of recently received words, the first word prediction expert determines whether the two complete data entries immediately preceding the partial data entry in the stream of characters corresponds to the two data entries immediately preceding the particular feasible word in the list of recently received words.

The word prediction system can also submit the list of feasible words to a second one of the word prediction experts, which compares the list of feasible words to a list of entries in the dictionary, which includes a word count for each dictionary entry. The word count for a particular dictionary entry indicates the historical frequency of the occurrence of the particular dictionary entry in the word prediction system.

The word prediction system can also submit the list of feasible words to a third one of the word prediction experts, which compares the list of feasible words to a list of entries in the dictionary, which includes a probability score for each dictionary entry. The probability score for a particular dictionary entry indicates the frequency of the occurrence of the particular dictionary entry in a training corpus.

The word prediction system can also submit the list of feasible words to a fourth one of the word prediction experts, which identifies a context parameter associated with the partial data entry. The fourth word prediction expert determines whether a feasible word has previously occurred in the word prediction system in association with the context parameter. The context parameter may be indicative of a particular user interface associated with a particular program module. Alternatively, the context parameter may be indicative of a particular structured field within a particular user interface associated with a particular program module.

The fourth word prediction expert determines whether the feasible word has previously occurred in the word prediction system in association with the context parameter by computing a hash value based on the context parameter and a word identification value associated with the entry in the list of feasible words. The fourth word prediction expert identifies a memory address based on the hash value and retrieves a stored signature value from the memory address. The fourth word prediction expert then determines whether the stored signature value corresponds to a signature value based on the computed hash value.

According to yet another aspect of the invention, the text completion system may receive a delimiter character converting a partial data entry into a complete data entry. In response, the word prediction system is updated for the complete data entry, and the text completion system discontinues the display of the completion suggestions for the partial data entry. Specifically, the word prediction system determines whether the complete data entry corresponds to a first entry in a dictionary. If the complete data entry corresponds to the first entry in the dictionary, the word prediction system increments a first word count value associated with the first entry in the dictionary. The word prediction system also randomly selects a second entry in the dictionary and decrements a second word count value associated with the second entry.

If the complete data entry does not correspond to an entry in the dictionary, the word prediction system adds the complete data entry to the dictionary and deletes another data entry from the dictionary. The word prediction system also adds the complete data entry to a list of recently received words. In addition, the word prediction system identifies a context parameter associated with the complete data entry and computes a hash value based on the context parameter and a word identification value associated with complete data entry. The word prediction system then identifies a memory address based on the hash value and stores a signature value based on the hash value at the memory address.

That the invention improves over the drawbacks of prior text completion systems and accomplishes the advantages described above will become apparent from the following detailed description of the exemplary embodiments and the appended drawings and claims.

DETAILED DESCRIPTION OF EXEMPLARY EMBODIMENTS

Figure 1:
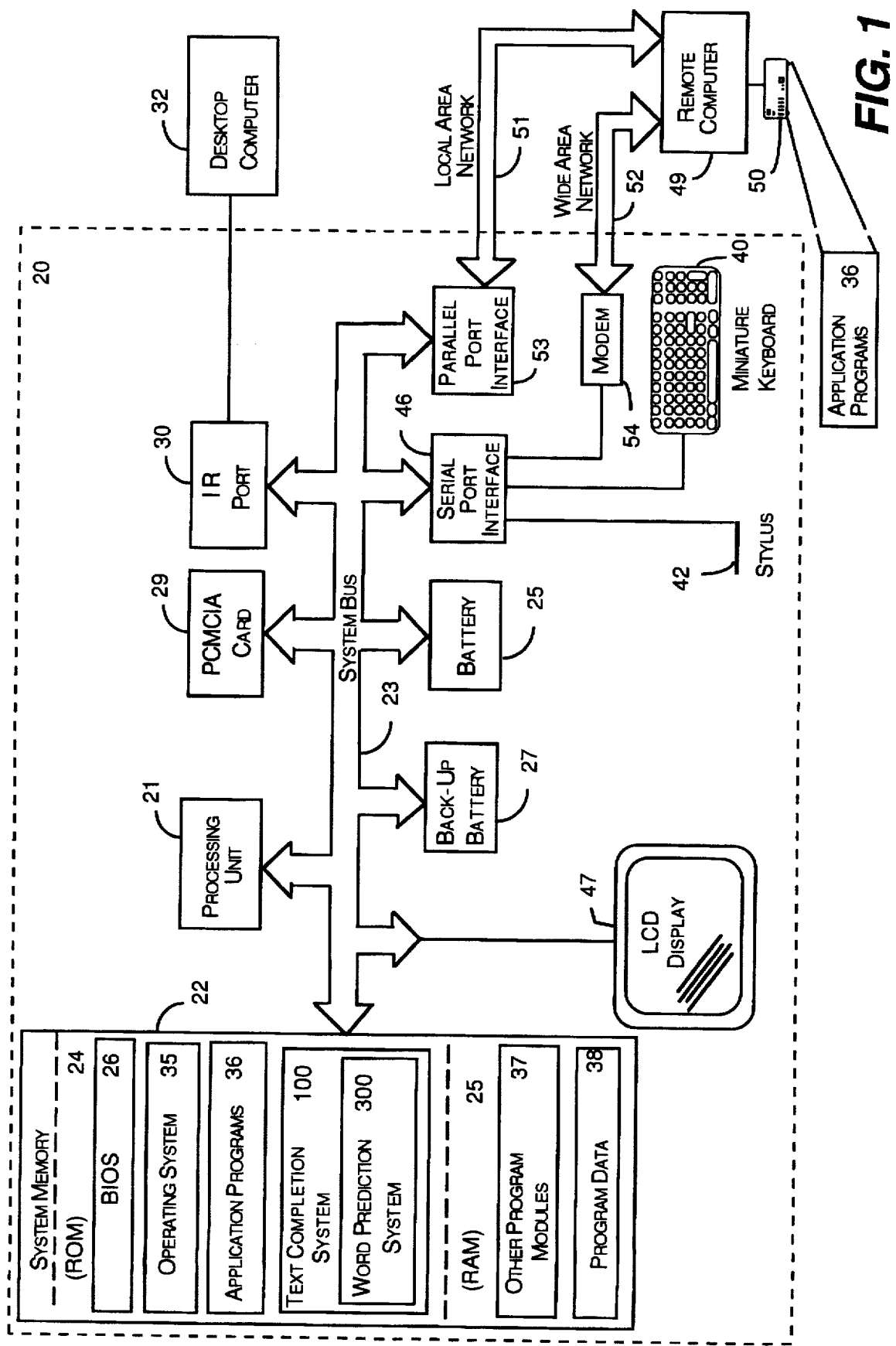
FIG. 1 is a functional block diagram of a miniature personal computer system that provides the operating environment for the exemplary embodiments of the present invention.

The present invention may be deployed as a text completion system that automatically displays a list of completion suggestions for a partial data entry in response to a pause in receipt of the data entry. The text completion system applies search criteria to the partial data entry. If the partial data entry satisfies the search criteria, the text completion system obtains a prioritized list of word predictions for the partial data entry from a word prediction system. The text completion system also applies display criteria to the word predictions to obtain a prioritized list of completion suggestions that satisfy the display criteria. This prioritized list of completion suggestions is then displayed in association with the partial data entry.

The prioritized list of completion suggestions is typically displayed in a pop-up list box in a non-intrusive manner, such as immediately under and to the right of the partial data entry. The completion suggestions are positioned in the list based on a computed indication of likelihood of being correct. The user may accept a completion suggestion from the list by touching a stylus to the display screen over the position of the desired completion suggestion, or by using the "arrow" keys to select a completion suggestion and the "enter" key to accept the selected completion suggestion.

The word prediction system includes a dictionary having a list of static dictionary entries and a list of dynamic dictionary entries. The static dictionary entries are predefined for the word prediction system and do not change as the system is used. The word prediction system includes a probability score associated with each entry in the static dictionary entry. The probability score indicates the frequency of the occurrence of the particular dictionary entry in a large training corpus. The dynamic dictionary augments the static dictionary with a list of the most recently received data entries that are not found in the static dictionary. The word prediction system also includes a word count associated with each dictionary entry. The word count indicates the historical frequency of the occurrence of the particular dictionary entry in the word prediction system.

In addition, the word prediction system includes an array of word identification values, such as a word ID history. The word ID history corresponds to a list of the words most recently received by the word prediction system in the order in which the words were received. The word ID history thus maintains a transcript of recently received data entries. The word prediction system also includes an array of signature values in which each signature value is based on a particular hash value and stored at a memory address based on the particular hash value. Each hash value is computed based on a word identification value and a context parameter associated with a complete data entry received by the word prediction system. The context parameter, such as a control ID, typically indicates an application program or a structured field within a user interface in which a data entry was received.

To produce a prioritized list of word predictions for a partial data entry, the word prediction system obtains a list of feasible words from the static and dynamic dictionaries. Feasible words are those complete words having the same prefix as the partial data entry. For each feasible word, the word prediction system obtains a word prediction score from each word prediction expert and computes a word value based on the feasible word's prediction scores and word ID. The word prediction system then positions each feasible word in the prioritized list based on the computed word value. To simplify the computation of the word value, each word prediction expert may be assigned a mutually exclusive set of bits within the word value structure. Each word value may then be computed by summing the word prediction scores associated for a feasible word with the corresponding word ID. The mutually exclusive sets of bits may be assigned to the word prediction experts to reflect a priority order among the word prediction experts.

To "learn" in response to user-defined data entries, the word prediction system is updated for each complete data entry received by the system. Specifically, the word prediction system determines whether the complete data entry corresponds to a first entry in the dictionary. If the complete data entry corresponds to the first entry in a dictionary, the word prediction system increments a first word count value associated with the first entry in the dictionary. The word prediction system also randomly selects a second entry in the dictionary and decrements a second word count value associated with the second entry. Decrementing randomly-selected word counts prevents the word count array from eventually becoming saturating and thus meaningless.

The word prediction system also determines whether the complete data entry corresponds to an entry in the static or dynamic dictionaries. If the complete data entry does not correspond to an entry in the static or dynamic dictionary, the word prediction system adds the complete data entry to the dynamic dictionary and deletes another data entry from the dynamic dictionary on a first-in-first-out (FIFO) basis. The word prediction system also adds the complete data entry to the word ID history. In addition, the word prediction system computes a hash value based on the word ID and the control ID for the complete data entry. The word prediction system then identifies a memory address in a hash table based on the hash value and stores a signature value based on the hash value at the memory address.

The text completion system may be deployed on an individual application program basis or on an application-independent basis. Accordingly, the text completion system may be deployed within an individual application program, within an operating system, or as a stand-alone utility that may operate on an application-independent basis. Application independence is the ability of the same text completion system to work with several different application programs, such as a word processing program, an e-mail program, a spreadsheet program, and so forth. Because different lists of completion suggestions may be appropriate for different application programs, and for different data files within the same application program, the text completion system may allow the user to select a particular word prediction system for use with a particular application program or data file.

To deploy the text completion system within an operating system or as an application-independent utility, an interface is defined within each application program through which the text completion utility may communicate with each application program. This allows the text completion utility to monitor the entry of characters into the application program user interface and to determine the location within the user interface to display the pop-up list box. A potential drawback of an application-independent deployment may be a slight reduction in the speed at which the text completion system performs its operations.

Exemplary Operating Environment

FIG. 1 and the following discussion are intended to provide a brief, general description of a suitable computing environment in which the invention may be deployed. While the invention will be described in the general context of an application-independent program that runs in conjunction with an operating system running on a miniature personal computer, those skilled in the art will recognize that the invention also may be implemented within other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both map entity and remote memory storage devices.

With reference to FIG. 1, an exemplary system for implementing the invention includes a miniature personal computer 20, including a processing unit 21, a system memory 22, and a system bus 23 that couples the system memory to the processing unit 21. The system memory 22 includes a read only memory (ROM) 24 and a random access memory (RAM) 25. A basic input/output system 26 (BIOS) containing the basic routines that help to transfer information between elements within the personal computer 20, such as during start-up, is stored in ROM 24. The ROM 24 also stores an operating system 35, a number of application programs 36 that are permanently installed on the computer 20, and a text completion utility 100 that implements the functionality of an exemplary embodiment of the invention.

The miniature computer 20 further includes a battery 25 and a back-up battery 27 to provide power for hand-held operation of the computer 20. A PCMCIA card 29 allows additional RAM and other components of a PCMCIA card to be installed on the computer 20. The miniature computer 20 also includes an infra-red (IR) port 30, which allows the miniature computer to communicate with a desktop computer 32 from time to time. This allows the miniature computer 20 to access resources within or connected to the desktop computer 32, such as a hard disk drive, an optical disk drive, printers, modems, networks, and so forth. It should be appreciated by those skilled in the art that other types of media that are readable by a computer, such as magnetic cassettes, flash memory cards, digital video disks, Bernoulli cartridges, and the like, may also be accessed through the desktop computer 32.

A number of program modules may be stored in the ROM 24 and the RAM 25, including an operating system 35, one or more application programs 36, other program modules 37, and program data 38. In particular, one of the program modules is the text completion utility 100 that includes certain embodiments of the invention, which are described below with reference to FIGS. 2–10. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A display device 47, typically a touch-sensitive liquid-crystal display (LCD), is also connected to the system bus 23. The miniature computer 20 may be connected with other peripheral output devices, such as speakers and the like.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a parallel port network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the present invention are incorporated into an application-independent utility for the hand-held personal computer (H/PC) miniature computer sold by Microsoft Corporation. Although this embodiment of the invention is configured to operate with acceptable performance characteristics on this particular platform, those skilled in the art will appreciate that the principles of the invention are not limited to the H/PC platform, but could equivalently be applied to any computer-implemented system that involves a substantial amount of text entry. For example, it is anticipated that the invention may be deployed in connection with future versions of Microsoft's H/PC and personal digital assistant (PDA) miniature computer platforms. It will be further appreciated that the embodiments of the invention could equivalently be implemented on host computers other than a miniature computer, and could equivalently be transmitted to the host computer by means other the inclusion on a factory-installed ROM, for example, by way of the network connection port 53.

Notwithstanding the broad applicability of the principles of the invention described above, it should be understood that the configuration of the exemplary embodiment as an application-independent utility for a miniature personal computer provides significant advantages. In particular, the text completion utility 100 described herein is specifically designed to exhibit acceptable memory-use and processing speed characteristics when implemented on the H/PC computer system 20. In so configuring the text completion utility 100, certain trade-off balances, particularly between the often conflicting goals of minimizing memory storage and increasing processing speed, have necessarily been struck. It should be understood that variations of the trade-off balances struck in the exemplary embodiments described herein are within the spirit and scope of the present invention, particularly in view of the fact that inevitable improvements in computer hardware and memory storage devices will make other trade-off balances feasible in the future.

User Interface for the Text Completion System

Figure 2A:
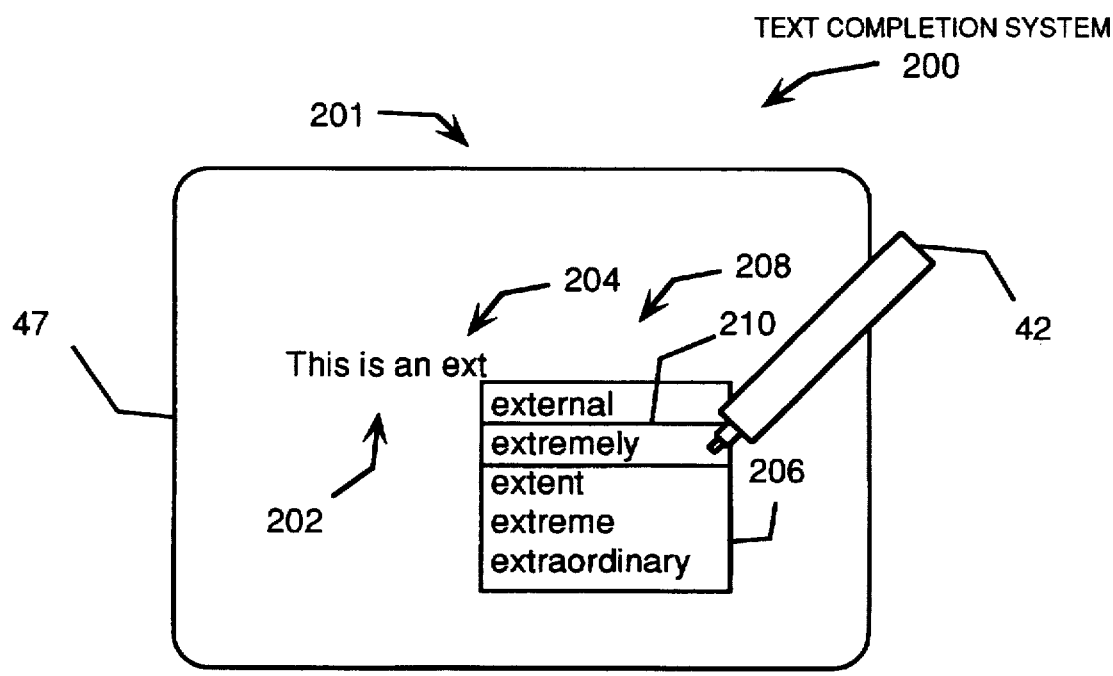
FIG. 2A illustrates a graphical user interface for a text completion system displaying a selected completion suggestion within a prioritized list of completion suggestions.

FIG. 2A illustrates a graphical user interface 201 for the text completion system 200. The graphical user interface is displayed on the touch-sensitive LCD screen 47. The user may enter input commands into the graphical user interface 201 using the miniature keyboard 40 or by using the stylist 42 to touch a desired control item on the LCD display.

The text completion system 200 monitors the entry of a string of characters 202 into a program module, such as a word processing program, an e-mail program, or the like.

For example, the user may enter the string of characters 202, "this is an ext" as shown in FIG. 2A. In this example, the string of characters 202 defines a number of complete data entries, "this is an," followed by a partial data entry 204, "ext." The complete data entries are denoted by ending delimiter characters, such as a punctuation mark or a space character. The partial data entry 204 thus includes the set of contiguous characters occurring after the last delimiter character.

The text completion system 200 detects a pause of predefined duration in the entry of the string of characters 202. The pause duration may be a user-definable parameter with a default value of 0.5 seconds. If a pause occurs that is longer than the predefined duration, the text completion system 200 determines whether the string of text 202 defines a partial data entry 204 that meets certain search criteria.

The search criteria allows the text completion system 200 to avoid annoying the user by displaying an excessive number of wrong completion suggestions. In particular, the search criteria allows the text completion system 200 to avoid displaying completion suggestions when the partial data entry 204 is too short to serve as a reasonable indication of the complete data entry that the user is in the process of entering. The search criteria, therefore, typically requires that the partial data entry 204 include at least a minimum number of characters. For example, the minimum number of characters set by the search criteria may be a user-definable parameter with a default value of three.

If the partial data entry 204 satisfies the search criteria, the text completion system 200 obtains a prioritized list of word predictions from a word completion system 300. The word predictions all share the partial data entry 204 as a prefix. For example, if the partial data entry 204 is "ext" as shown in FIG. 2A, then the word predictions all have the letters "ext" as a prefix, such as "external," "extremely," "extent," and so forth. The word prediction system 300 positions the word predictions in a prioritized list based on a computed likelihood of being a correct suggestion. The word prediction system 300 is described in more detail with reference to FIG. 3 below.

To further avoid annoying the user by displaying very short completion suggestions, such as completion suggestions that are only one or two characters longer than the partial data entry, the text completion system 200 applies display criteria to the list of word predictions returned by the word prediction system 300. The display criteria typically requires that the text completion suggestions include at least a predefined number of additional characters more than the partial data entry 204. For example, the minimum number of additional characters set by the display criteria may be a user-definable parameter with a default value of three.

If there are word predictions that satisfy the display criteria, and thus qualify as completion suggestions, the text completion system 200 displays a prioritized list of the completion suggestions in association with the partial data entry 204. Specifically, a pop-up list box 206 appears on the LCD display 47 in association with the partial data entry 204. The list box 206 is preferably displayed immediately below and to the right of the partial data entry 204. This position avoids obscuring text in the most frequent data entry scenario, in which the partial data entry 204 is the most recent data entered by the user. If the partial data entry 204 is too close to the right or bottom edge of the LCD display 47, however, the list box 206 may be displayed immediately above or to the left of the partial data entry 204.

The pop-up list box 206 includes a selection indicator 210, which is initially placed on the completion suggestion at the top of the list box, which is the most likely completion suggestion. The selection indicator 210 is typically shown by a reverse-color convention. For example, selected text is shown as white text in a black background in a user interface in which non-selected text is displayed as black text on a white background.

The user may change the selected completion suggestion by manipulating the position of the selection indicator 210 using the up and down "arrow" keys on the keyboard. Once the user has selected the desired completion suggestion, the user may accept the selection by entering an acceptance command, such as pressing the "enter" key. Alternatively, the user may enter a combined selection and acceptance command by touching the stylist 42 to the LCD display screen 47 at the area of the desired text completion suggestion. This allows the user to accept any of the completion suggestions without having to first manipulate the position of the selection indicator 210.

Figure 2B:
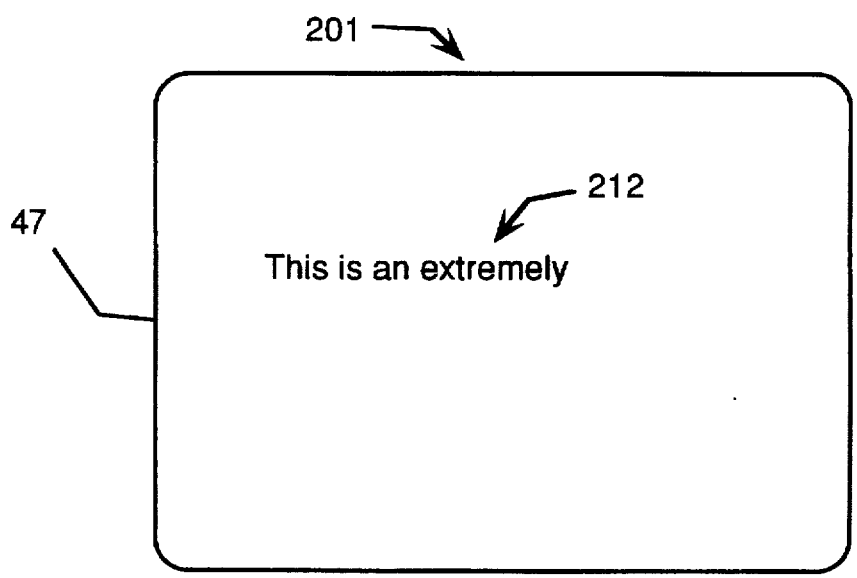
FIG. 2B illustrates the graphical user interface of FIG. 2A after a user has accepted the selected completion suggestion.

FIG. 2B illustrates the graphical user interface 201 after the user has entered an acceptance command for a selected text completion suggestion. The transition from FIG. 2A to FIG. 2B illustrates the effect of a user command accepting the completion suggestion "extremely" for the partial data entry "ext." This acceptance command causes the partial data entry 204 "ext" to be completed with the additional characters "remely" of the selected text completion suggestion 212 "extremely." The display of the pop-up list box 206 is then discontinued. This allows the user to enter the complete data entry "extremely" without having to type the additional characters "remely" required to get from "ext" to "extremely." The text completions system 200 thus saves key strokes, which is an important attribute in the user interface 201 for the miniature computer 20.

Configuration of the Word Prediction System

Figure 3:
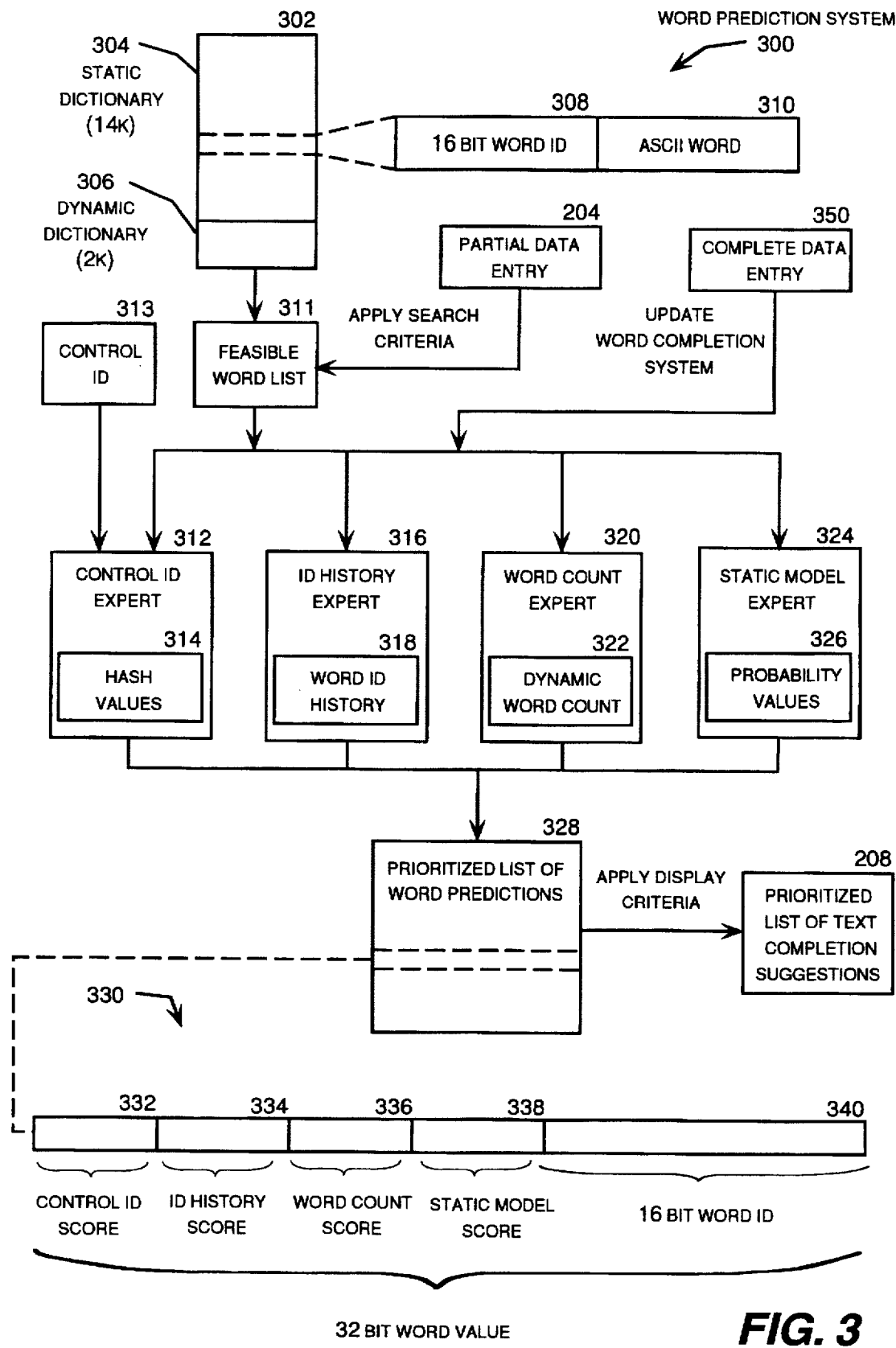
FIG. 3 is a functional block diagram illustrating a word prediction system in accordance with an exemplary embodiment of the present invention.

FIG. 3 is a block diagram illustrating the word prediction system 300, which produces prioritized lists of word prediction suggestions for the text completion system 200. The word prediction system 300 includes a dictionary 302, which includes a compressed static dictionary 304 and a compressed dynamic dictionary 306. The static dictionary, which is preferably about 14 k bytes, includes a predefined set of words. The dynamic dictionary 306, which is preferably 2 k bytes, is a dynamically changing list of the most recently entered words that are not in the static dictionary 304. Thus, the static dictionary 304 comes preprogrammed, whereas the dynamic dictionary 306 is responsive to text entered by the user. The dynamic dictionary 306 typically records all of the words entered by the user that are not in the static dictionary 304 on a first-in-first-out (FIFO) basis. To avoid filling the dynamic dictionary with trash, however, the dynamic dictionary may ignore words longer than a predefined number of characters, such as 20 characters. This prevents very long strings, such as those caused by indiscriminate typing or holding a key down, from filling the dynamic dictionary 306.

Each entry in the dictionary 302 includes a word identification value, such as a 16-bit word ID 308, associated with an ASCII word 310. To minimize computation and memory requirements, the word prediction system 300 manipulates the 16-bit word IDs rather than the ASCII words themselves 310. The words in the static dictionary 304 are maintained in a predefined lexicographic order to enable binary searching of the static dictionary. The words in the dynamic dictionary 306, which are maintained in a FIFO order, are searched linearly. The word prediction system 300 therefore shifts the word IDs corresponding the entries in the dynamic dictionary 306 in the other portions of the word prediction system whenever old words are removed from the dynamic dictionary. To avoid shifting word IDs every time a new word is added to the dynamic dictionary 306, and thus improve processing speed, words may be removed from the dynamic dictionary in multi-word groups. For example, one-eighth of the words in the dynamic dictionary may be removed whenever the dynamic dictionary reaches its full capacity.

The word prediction system 300 includes four word prediction experts, a control ID expert 312, an ID history expert 316, a word count expert 320, and a static model expert 324. Each word prediction expert is a specialized routine for producing word predictions for partial data entries using a different word prediction technique. In some cases, a particular word prediction expert may be skipped to save processing time. The operation of the specific word prediction experts is described in detail with reference to FIGS. 5–9.

As a first step, the word prediction system 300 monitors the entry of a string of characters to obtain a partial data entry 204. If the partial data entry satisfies the search criteria, a list of feasible words 311 is retrieved from the dictionary 302. Specifically, a binary search is conducted of the static dictionary 304 to identify the words in the static dictionary that have the same prefix as the partial data entry 204. A linear search is also conducted of the dynamic dictionary 306 to identify the entries in the dynamic dictionary that have the same prefix as the partial data entry 204. This produces the list of feasible words 311, which is compared to the recently received data entries in a word ID history 318. The word prediction system 300 identifies and marks those entries in the feasible word list 311 that appear in the word ID history 318. The word prediction system 300 then feeds the marked feasible word list 311 to the word prediction experts.

The control ID expert 312 receives the partial data entry 204 along with the word IDs in the feasible word list 311. The control ID expert 312 receives a context parameter, such as the control ID 313, for the partial data entry 204. The control ID is a value that indicates context-related information regarding the partial data entry 204. For example, a control ID may be assigned to a particular user interface, such as a user interface for composing e-mail messages. Alternatively, a control ID may indicate a particular structured field within a user interface. A first control ID may be assigned to the "to" field in an e-mail message, for instance, and a second control ID may be assigned to the body of the e-mail message. Many other context parameters for which control IDs may be assigned will become apparent to those skilled in the art.

The word prediction principle underlying the control ID expert 312 is that a complete word previously entered into a particular user interface control is a likely prediction for a partial data entry having the same prefix as the complete word, if the partial data entry has been entered into the same user interface control. Maintaining a complete list of control ID and word ID pairs, however, would consume a large amount of memory. A hash technique is therefore used to reduce the memory required to implement the control ID expert 312.

This hash technique involves computing a pseudo-random number, known as a "hash value," for each complete data entry received by the word prediction system 300. The hash value is computed by applying a mathematical manipulation to the data entry's word ID and control ID. The first ten bits of the hash value are used to identify a memory address in a hash table 314. The ten-bit address allows the hash table 314 to include 1,024 addressable records. The last eight bits of the hash value are used as a signature that is stored at the associated memory address. The eight-bit signature allows 256 different signature values. A particular word ID and control ID pair always produces the same hash value, and thus the same signature stored at the same memory address in the hash table 314. Although there is a non-zero probability that a different word ID and control ID pair may produce the same hash value, a match in the hash table 314 for a particular word ID and control ID pair is a very good indication that the particular word ID was previously entered into the particular control ID.

Accordingly, for each word in the feasible word list 311, the control ID expert 312 computes a hash value using the word ID from the feasible word list and the control ID 313 for the partial data entry 204. The first ten bits of the hash value are used to identify a memory address and the last eight bits are used as a signature. If the computed signature appears at the associated memory address, this is a very good indication that the word from the feasible word list 311 was previously entered into the same control ID into which the partial data entry 204 was entered. A word prediction having a match in the hash table 314 is therefore considered a more likely word prediction than one that does not have a match in the hash value table.

The static model expert 324 also receives the partial data entry 204 along with the word IDs in the feasible word list 311. The static model expert maintains a list of predefined probability values 326 for the words in the static dictionary 304. The probability value for each entry in the static dictionary 304 is indicative of the frequency of occurrence of the word in a large training corpus. For example, the probability values may be two-bit numbers having four possible values. These two-bit probability values allow the words in the static dictionary to be grouped into four categories, which may be conceptualized as "very frequent," "frequent," "infrequent," and "very infrequent." A high probability value from the training corpus is considered an indication of a high probability of a correct word prediction. For each word in the feasible word list 311, the static model expert 324 retrieves the word's probability value and computes a static model score based on the probability value.

The partial data entry 204 and the word IDs in the feasible word list 311 are also fed to the word count expert 320. The word count expert 320 maintains a dynamic word count array 322. This array indicates the frequency that the word prediction system 300 receives each word in the dictionary 302. A high frequency of receipt is considered an indication of a high probability of a correct word prediction. For each word in the feasible word list 311, the static model expert 324 retrieves the corresponding word count and computes a word count score based on the word count.

The partial data entry 204 and the word IDs in the feasible word list 311 are also fed to the ID history expert 316. This expert maintains the word ID history 318, which preferably stores a 2 k byte transcript of the word IDs for the most recent data entries received by the word prediction system 300. For a current word in the feasible word list 311, the ID history expert 316 checks to see whether the current word is found in the word ID history 318. If the current word is found in the word ID history 318, the ID history expert 316 checks to see whether the words immediately preceding the partial data entry 204 in the string of characters 202 are the same as the words preceding current words in the word ID history 318.

If the two words immediately preceding the current word in the word ID history 318 are the same as the two words immediately preceding the partial data entry 204 in the string of characters 202, the ID history expert 316 assigns a high ID history score. If the word immediately preceding the current word in the word ID history 318 is the same as the word immediately preceding the partial data entry 204 in the string of characters 202, the ID history expert 316 assigns a medium ID history score. If the current word appears in the word ID history 318 without a preceding word match, the ID history expert 316 assigns a low ID history score. The ID history expert 316 assigns a zero ID history score if the current word does not appear in the word ID history 318.

Once a score has been obtained from each word prediction expert for each word in the feasible word list 311, the word prediction system 300 positions the various word predictions in a prioritized list 328 based on an indication of each word prediction's likelihood of being a correct prediction for the partial data entry 204. Specifically, for each word in the feasible word list 311, the word ID is combined with the scores from the various word prediction experts to create a 32-bit word value 330. The word predictions are positioned in the prioritized list 328 in numerically descending order of the computed word values 330.

Although more complicated schemes will be evident to those skilled in the art, an advantageously simplify method for combining the word IDs with the scores from the various word prediction experts is to assign a mutually exclusive set of bits in the word value 330 structure to the word ID and to the score received from each word prediction expert. For example, the word prediction value 330 may be organized so that the sixteen least significant bits 340 correspond to the word ID. A set of the next most significant bits 338 may be assigned to the static model score, a set of the next most significant bits 336 may be assigned to the word count score, a set of the next most significant bits 334 may be assigned to the ID history score, and the most significant bits 332 may be assigned to the control ID score.

In particular, if the 32 bits of the word value 300 are numbered zero through 31, the control ID expert 312 may be assigned the most significant bit number 31 of the word value 330. Thus, a control ID score equal to $2^{31}$ may indicate a control ID match, and a control ID score equal to zero may indicate no control ID match. The ID history expert 316 may be assigned bit numbers 28, 29, and 30 of the word value 330. Thus, an ID history score equal to $2^{30}$ may indicate an ID history match with two preceding words in common, an ID history score equal to $2^{29}$ may indicate an ID history match with one preceding word in common, an ID history score equal to $2^{28}$ may indicate an ID history match without a preceding word in common, and an ID history score equal to zero may indicate no ID history match. The word count expert 320 may be assigned bit numbers 20 through 27 of the word value 330. Thus, a word count score equal to $2^{20}$ times a word count may accommodate word counts up to eight bits. The static model expert 324 may be assigned bit numbers 16 through 19 of the word value 330. Thus, a static model score equal to $2^{16}$ times a probability score accommodates probability scores up to four bits. The lower sixteen bits 1–15 of the word value 330 may be used to store the 16-bit word ID.

Stated differently, the bits of the word value 330 may be assigned so that the word ID sets the bits 0–15, the static model expert 324 sets bits 16–19, the word count expert 320 sets bits 20–27, the ID history expert 316 sets bits 28–30, and the control ID expert 312 sets bit 32. These bit assignments are summarized below in Table 1.

TABLE 1

| Component | Expert Score | Bit Assignment |
| --- | --- | --- |
| Control ID Expert | $2^{31}$ or 0 | 31 |
| ID History Expert | $2^{28}$–$2^{30}$ or 0 | 28–30 |
| Word Count Expert | $2^{20}$–$2^{27}$ or 0 | 20–27 |
| Static Model Expert | $2^{16}$–$2^{19}$ or 0 | 16–19 |
| Word ID | N/A | 0–15 |

The structure of the word value 330 shown in Table 1 allows the word value for a particular word to be computed by summing the corresponding word ID with the scores returned by the various word prediction experts. Computationally expensive multiplication and division operations are thus avoided in the computation of the word value. The structure of the word value 330 shown in Table 1 also permits assignment of the bits of the word value structure to the word prediction experts so as to rank the experts in the pre-defined order shown in Table 1. Specifically, the bit assignment shown in Table 1 orders the word prediction experts in the following priority: control ID expert 312 (bit assignment 332), ID history expert 316 (bit assignment 334), word count expert 320 (bit assignment 336), and static model expert 324 (bit assignment 338). Because a word value below $2^{16}$ indicates that none of the word prediction experts "fired" (i.e., returned a non-zero score) to indicate a likely prediction, any word predictions having a word value below a threshold value of $2^{16}$ are typically not included in the prioritized list of word predictions 328. The word prediction system 300 may also be configured to allow the user to define a higher minimum threshold for a word value 330 to further limit the number of wrong suggestions returned to the text completion system 200.

Given the foregoing structure of the word value 330, the results returned by the word prediction experts may be quickly manipulated into the prioritized list of word predictions 328. The word prediction system 300 then returns the prioritized word prediction list 328 to the text completion system 200, which applies the display criteria to the word prediction list 328 to create the prioritized list of completion suggestions 208, as described previously. The highest-ranking completion suggestions 208, up to a predefined maximum display number, are then displayed in the pop-up list box 206. The maximum display number may be a user-definable parameter with a default value of five.

Operation of the Text Completion System

Figure 4:
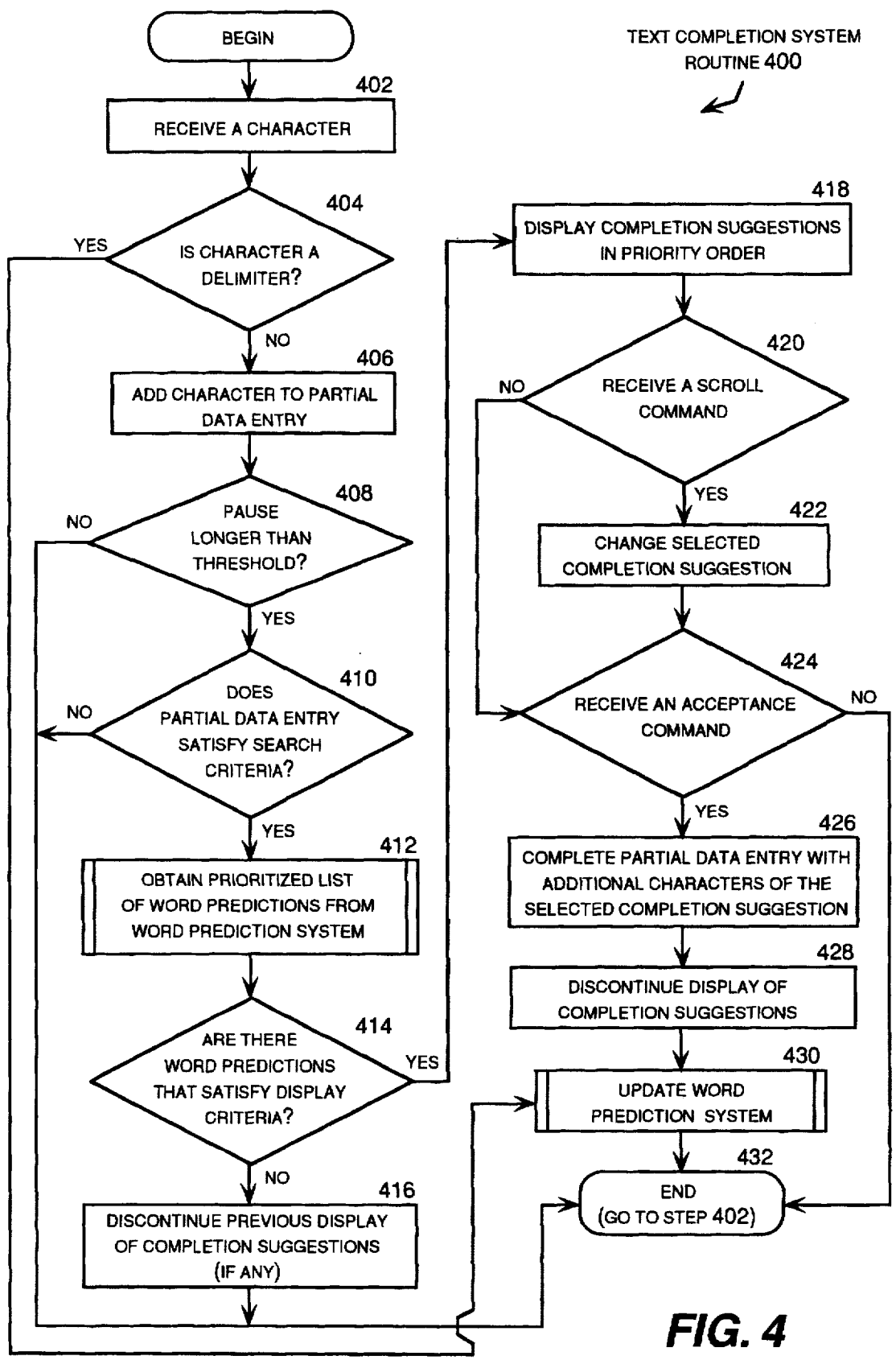
FIG. 4 is a logic flow diagram illustrating the operation of a text completion system in accordance with an exemplary embodiment of the present invention.

FIG. 4 is a logic flow diagram illustrating a routine 400 for operating the text completion system 200. Throughout the following description of routine 400, reference will occasionally be made to the graphical user interface 201 shown on FIGS. 2A–2B. The text completion system 200 monitors the receipt of a string of characters 202 into a program module, such as a word processing program, and e-mail program, or the like. In step 402, the text completion system 200 receives of a particular character. Step 402 is followed by step 404, in which the text completion system 200 determines whether the received character is a delimiter character that denotes a complete data entry, such as a punctuation mark or a space character. If the received character is not a delimiter character, the "NO" branch is followed to step 406, in which the received character is added to a partial data entry 204. Thus, the partial data entry may be defined as the contiguous characters received since the last delimiter character.

Step 406 is followed by step 408, in which the text prediction system 200 determines whether a pause longer than a predetermined threshold duration has occurred since the receipt of the character. The predetermined threshold duration may be a user-definable parameter with a default value of 0.5 seconds. If a pause longer than the threshold duration has occurred, the "YES" branch is followed to step 410, in which the text prediction system 200 determines whether the partial data entry satisfies certain search criteria. Typically, the search criteria requires that the partial data entry include at least a predetermined number of characters. The predetermined number of characters may be a user-definable parameter with a default value of three.

If the partial data entry satisfies the search criteria, the "YES" branch is followed to routine 412, in which the text completion system 200 obtains a prioritized list of word predictions from the word prediction system 300. Routine 412 for the word prediction system is described in detail with reference to FIGS. 5–10 below. Routine 412 is followed by step 414, in which the text completion system 200 determines whether any of the word predictions received from the word prediction system 300 satisfy certain display criteria. For example, the display criteria may require that a word completion include at least a predefined number of additional characters more than the partial data entry to qualify as a completion suggestion. The predetermined number of additional characters may be a user-definable parameter with a default value of three.

If there are no word predictions that satisfy the display criteria, the "NO" branch is followed from step 414 to step 416, in which the text completion system 200 discontinues the previous display of completion suggestions, if any.

If there are text completion suggestions that satisfy the display criteria, the "YES" branch is followed from step 414 to step 418, in which the completion suggestions are displayed in priority order in the list box 206 on the LCD display 47. The maximum number of completions suggestions displayed in the pop-up list box 206 may be a user-definable parameter with a default value of five.

Step 418 is followed by step 420, in which the text completion system 200 may receive a scroll command, typically from the up or down "arrow" keys. If the text completion system 200 receives a scroll command, the "YES" branch is followed to step 422, in which the text completion system responds to the scroll command by changing the selected text completion suggestion. Step 422 and the "NO" branch from step 420 are followed by step 424, in the which the text completion 200 may receive an acceptance command. The user may enter an acceptance by pressing the "enter" key. Alternatively, the user may enter a combined selection and acceptance command by touching the stylist 42 to the LCD display screen 47 at the area of the desired text completion suggestion.

If the text completion system 200 receives an acceptance command, the "YES" branch is followed from step 424 to the 426, in which the partial data entry is completed with the additional characters of the selected completion suggestion. Rather than completing the partial data entry with the additional characters of the selected completion suggestion, the partial data entry could equivalently be replaced by the entire selected completion suggestion. In addition, if the user enters an acceptance command before the expiration of the pause interval, the text completion system 200 responds immediately so that the user does not have to wait for the pause interval to time out. Step 426 is followed by step 428, in which the text completion system 200 causes the display of the list box 206 to be discontinued. Step 428 is followed by routine 430, in which the word prediction system 300 is updated. Step 430 is followed by the "END" step 432, which returns to step 402, in which the text completion system 200 receives another character.

Referring again to step 404, if the character received by the word prediction system 300 is a delimiter character, the "YES" branch is followed to routine 430, in which the word prediction system 300 is updated. Thus, the word prediction system 300 is updated each time the text completion system 200 receives a complete data entry. A complete data entry may be received when the user enters a delimiter character (i.e., the "YES" branch from step 404) or when the user inputs an acceptance command to select a completion suggestion (i.e., from step 428).

Referring again to step 408, if the text completion system 200 does not detect a pause longer than the threshold duration, the "NO" branch is followed to the "END" step 432, which returns to step 402, in which the text completion system 200 receives another character. Similarly, if the partial data entry does not satisfy the search criteria, the "NO" branch is followed from step 410 to the "END" step 432. In addition, if the text completion system 200 does not receive an acceptance command in step 424, the "NO" branch is followed from step 424 to the "END" step 432.

As noted previously, in certain embodiments the user may have the ability to select different word prediction systems for use with different application programs or data files. In this case, certain parameters that affect the operation of the word prediction system, such as the threshold duration (step 408), the search criteria (step 410), the display criteria (step 414), and the maximum number of completion suggestions displayed in the list box 206 (step 418) may be different for different word prediction systems. In addition, the system may be configured with a number of user-selectable dictionaries, such as a medical dictionary, a technical dictionary, and so forth. In this case, the dictionary used in a particular situation may be user-definable, and a default dictionary may be tied to a dynamic parameter, such as registered user of the system. This allows individual dynamic dictionaries and word ID histories to be stored for different users.

Operation of the Word Prediction System

Figure 5:
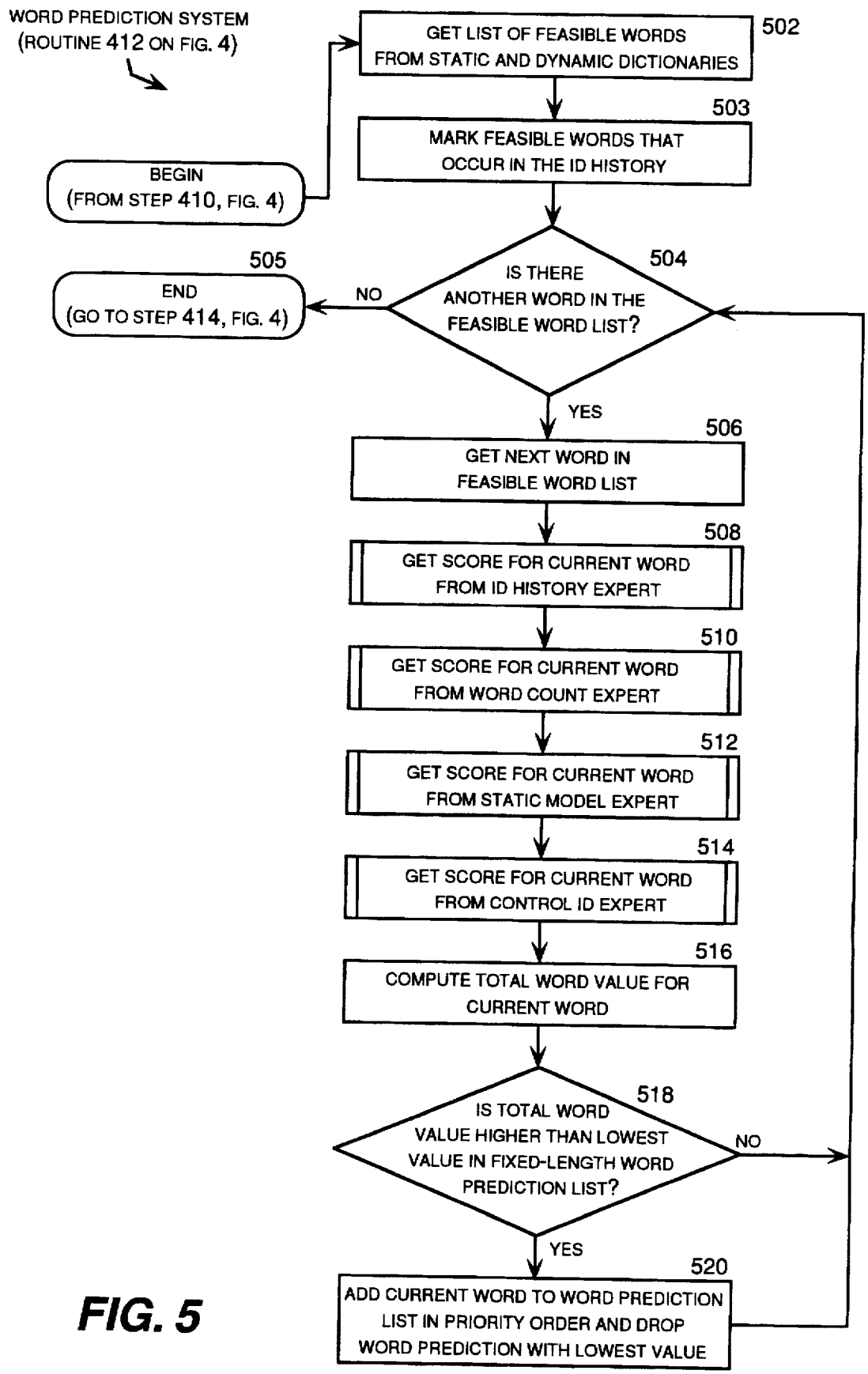
FIG. 5 is a logic flow diagram illustrating the operation of a word prediction system in accordance with an exemplary embodiment of the present invention.

Throughout the following description of FIGS. 5–10, reference will occasionally be made to the functional block diagram of the word prediction system 300 shown on FIG. 3. FIG. 5 is a logic flow diagram illustrating routine 412 for operating the word prediction system 300. Routine 412 begins after step 410, shown on FIG. 4. In step 502, the word prediction system 300 obtains a list of feasible words 311 from the dictionary 302. Specifically, a binary search is conducted of the static dictionary 304 to identify words that have the same prefix as the partial data entry. A linear search is also conducted of the dynamic dictionary 306 to identify words that have the same prefix as the partial data entry. In step 503, the word prediction system 300 compares the list of feasible words 311 to the word ID history 318 and marks feasible words that have occurred in the word ID history.

The word prediction system then submits the marked list of feasible words 311 to each word prediction expert. The word prediction system 300 includes four word prediction experts, control ID expert 312, an ID history expert 316, a word count expert 320, and a static model expert 324. The word prediction experts process the feasible words one at a time, assigning a score to each feasible word.

Step 503 is followed by step 504, in which the word prediction system 300 determines whether there is another word in the feasible word list 311. If there is not another word in the feasible word list, the "NO" branch is followed to the "END" step 505, which returns to step 414 on FIG. 4. If there is another word in the feasible word list 311, the "YES" branch is followed from step 504 to step 506, in which the word prediction system 300 gets the next word in the feasible word list. Step 506 is followed by routine 508, in which the word completion system 300 obtains an ID history score from the ID history expert 316. Routine 508 for the ID history expert is described below with reference to FIG. 6.

Routine 508 is followed by routine 510, in which the word prediction system 200 obtains a word count score from the word count expert 320. Routine 510 for the word count expert 320 is described below with reference to FIG. 7. Routine 510 is followed by routine 512, in which the word prediction system 300 obtains a static model score from the static model expert 324. Routine 512 for the static model expert is described below with reference to FIG. 8. Routine 512 is followed by routine 514, in which the word prediction system 300 obtains a control ID score from the control ID expert 312. Routine 514 for the control ID expert 312 is described below with reference to FIG. 9.

Routine 514 is followed by step 516, in which the word prediction system 300 computes a word value 330 for the current word from the feasible word list 311. To compute the total word value 330, the score from each word prediction expert for the current word is appended to the 16-bit word ID to form a 32-bit word value 330, as described previously with reference to FIG. 3. Step 516 is followed by step 518, in which the word prediction system 300 determines whether the total word value 330 for the current word is higher than the lowest word value in a fixed-length prioritized word prediction list 328. The prediction list 328 is initialized with default entries having word values of zero. Accordingly, new words are added to the list 328 so that the list maintains a predefined number of the top scoring words.

If the word value 330 for the current word is higher than the lowest value in the word prediction list 328, the "NO" branch loops from step 518 backs to step 504, in which the word prediction system 300 determines whether there is another word in the feasible word list 311. If the total word value 330 for the current word is higher than the lowest value in the word prediction list 328, the "YES" branch is followed to step 520, in which the current word is added to the word prediction list 328 in priority order. Adding the current word to the word prediction list 328 causes the word having the lowest word value 330 to be dropped from the list. From step 520, routine 412 loops back to step 504.

Thus, routine 412 is operative to obtain a score from each control expert for each word in the feasible word list 311. Routine 414 then combines the scores for each word with the 16-bit word ID to compute a word value 330 for each word in the feasible word list 311. Those word values are then ranked in a priority order, preferably descending order of the numerical word values 330, and a predefined number of the words having the highest word values are selected as the prioritized list of word predictions 328. The word prediction system 300 returns the prioritized list of word predictions 328 to the text prediction system 200, which applies display criteria to the prioritized list of word predictions 328. Those word predictions that satisfy the display criteria, and thus qualify for the list completion suggestions 208, are displayed in the pop-up list box 206 in priority order.

Operation of the ID History Expert

Figure 6:
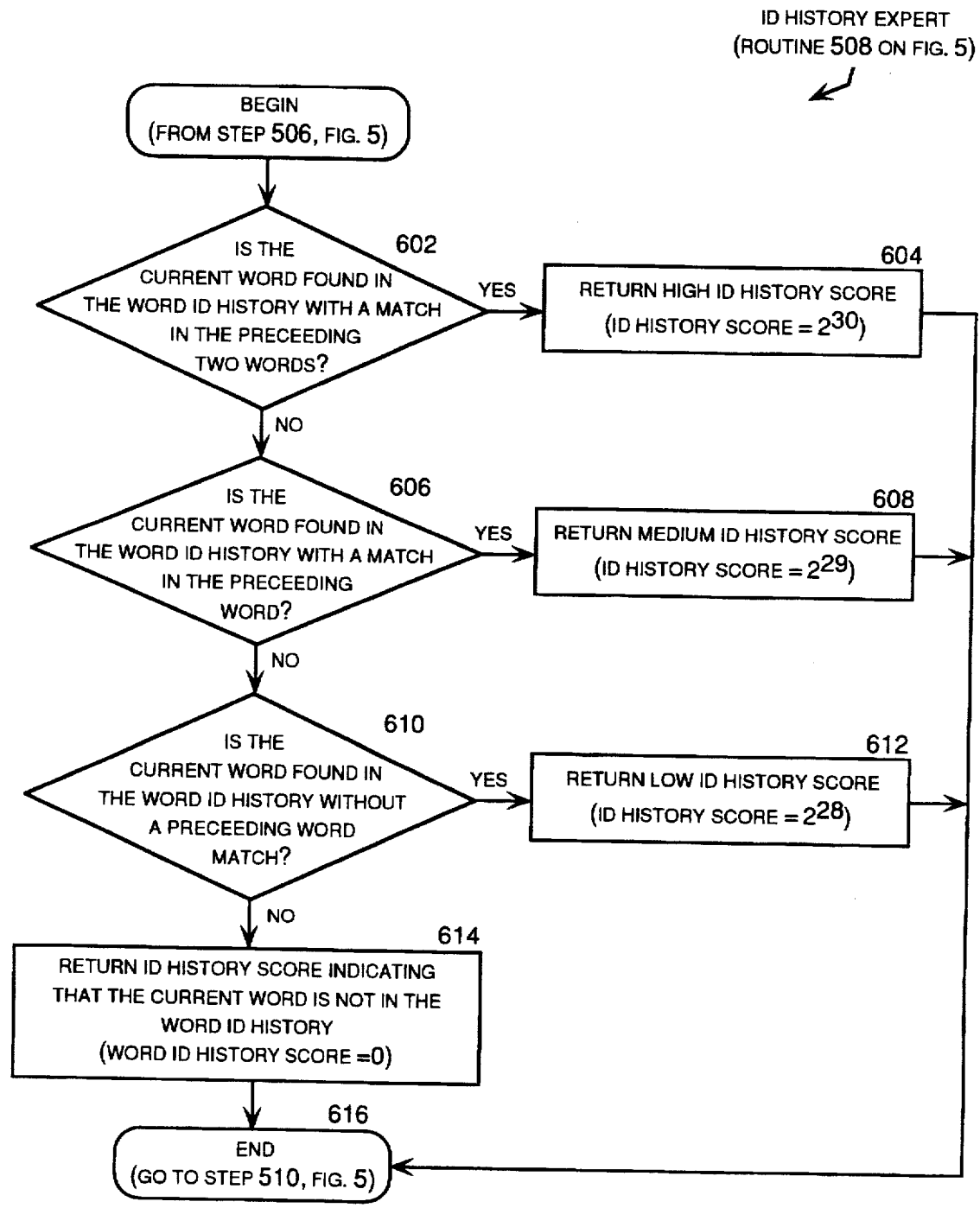
FIG. 6 is a logic flow diagram illustrating the operation of an ID history word prediction expert in accordance with an exemplary embodiment of the present invention.

FIG. 6 illustrates routine 508 for the ID history expert 316. Routine 508 begins following step 506 shown on FIG.

5. In step 602, the ID history expert 316 determines whether the current word is found in the word ID history 318 with a match in the preceding two words. That is, the ID history expert 316 determines whether the two complete data entries in the string of characters preceding the partial data entry 204 are the same as the two data entries immediately preceding the current word (i.e., a feasible word from the feasible word list 311) in the word ID history 318. If the current word is found in the word ID history 318 with a match in the preceding two words, the "YES" branch is followed to step 604, in which the ID history expert 316 returns a high ID history score. For the word value structure shown in Table 1, the ID history score is assigned a value of $2^{30}$, which is the highest ID history score. This ID history score of $2^{30}$ has been selected to set bit number 30 in the word value 330 for the current word.

If the current word is not found in the word ID history 318 with a match in the preceding two words, the "NO" branch is followed to step 606, in which the ID history expert determines whether the current word is found in the word ID history 318 with a match in the preceding word. That is, the ID history expert 316 determines whether the complete data entry in the string of characters immediately preceding the partial data entry 204 is the same as the complete data entry immediately preceding the current word in the word ID history 318. If the current word is found in the word ID history 318 with a match in the preceding word, the "YES" branch is followed to step 608, in which the ID history expert 316 returns a medium ID history score. For the word value structure shown in Table 1, the ID history score is assigned a value of $2^{29}$, which is a middle ID history score. This ID history score of $2^{29}$ has been selected to set bit number 29 in the word value 330 for the current word.

If the current word is not found in the word ID history 318 with a match in the preceding word, the "NO" branch is followed to from step 606 to step 610, in which the ID history expert 316 determines whether the current word is found in the ID history 316 without a preceding word match. If the current word is found in the ID history 316 without a preceding word match, the "YES" branch is followed to step 612, in which the ID history expert 316 assigns a low ID history score for the current word. For the word value structure shown in Table 1, the ID history score is assigned a value of $2^{28}$, which is a low ID history score. This ID history score of $2^{28}$ has been selected to set bit number 28 in the word value 330 for the current word.

If the current word is not found in the word ID history, the "NO" branch is followed from step 610 to step 614, in which the ID history expert 316 returns a word count score indicating that the word is not present in the word ID history 318. For example, the ID history expert 316 may return an ID history score equal to zero in this case. Steps 604, 608, 612, and 614 are followed by the "END" step 616, which returns to step 510 shown on FIG. 5.

Operation of the Word Count Expert

Figure 7:
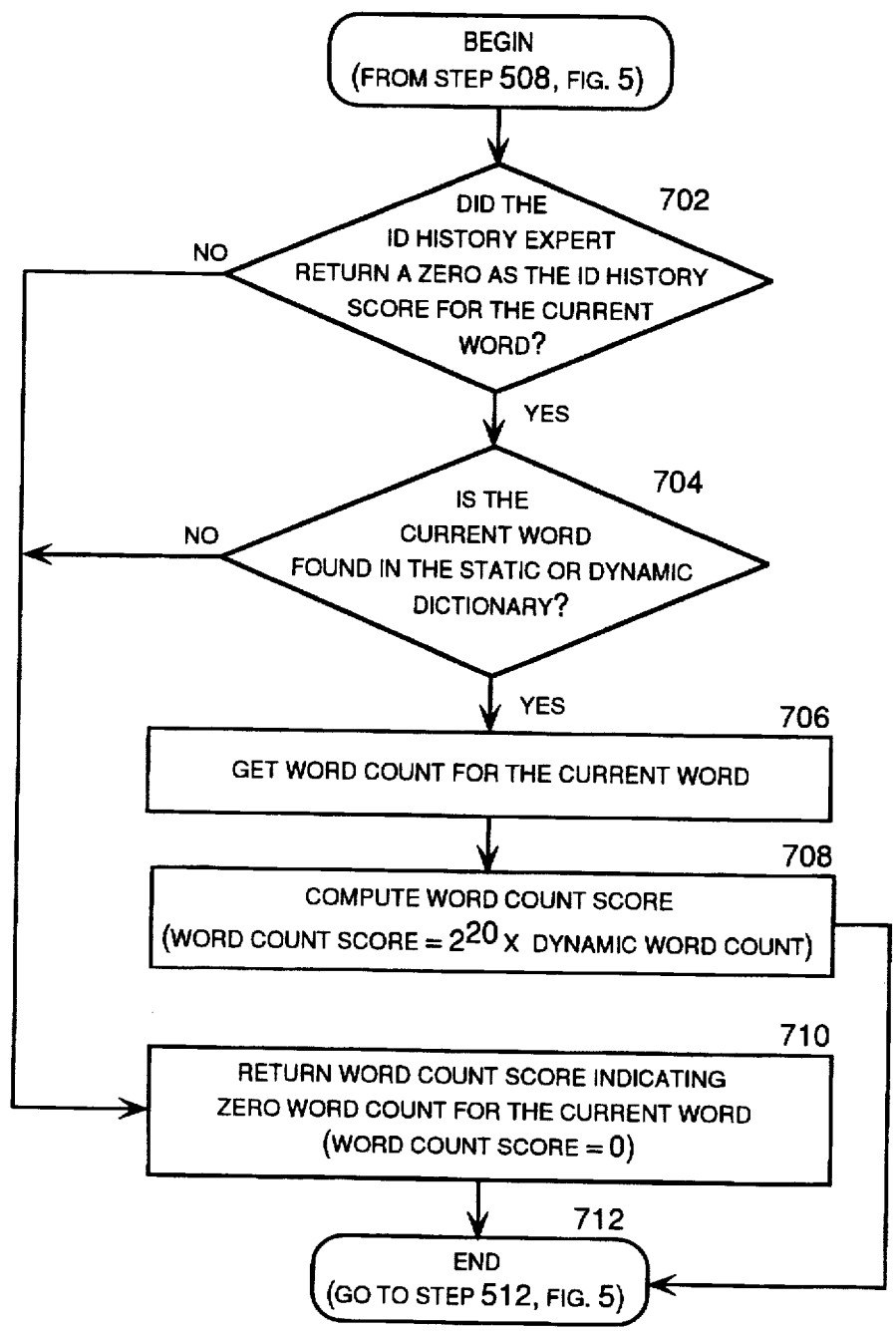
FIG. 7 is a logic flow diagram illustrating the operation of a word count word prediction expert in accordance with an exemplary embodiment of the present invention.

FIG. 7 illustrates routine 510 for the word count expert 320. Routine 510 begins after step 508 shown on FIG. 5. In step 702, the word count expert 320 determines whether the ID history expert 316 returned a zero ID history score for the current word. If the ID history expert 316 did not return zero ID history score for the current word, the "NO" branch is followed to step 710, in which the word count expert 320 returns a zero word count score for the current word. Step 710 is followed by the return step 712, which returns to step 512 shown on FIG. 5.

Step 702 allows the word count expert 320 to be skipped if the ID history expert 316 returned a non-zero ID history score for the current word. This is because the ID history expert 316 is considered a more reliable predictor than the word count expert 320 for words that have been received recently by the word prediction system 300 and, therefore, are present in the word ID history 318. Thus, to increase the processing speed of the word prediction system 300, the word count expert 320 may be skipped if the ID history expert 316 did not return a zero ID history score for the current word.

Those skilled in the art will appreciate that step 702 may be skipped so that the word count expert 320 is called even if the ID history expert 316 does not return a zero ID history score for the current word. Whether to include step 702 in routine 510 is a trade off between the competing objectives of providing a large number completion suggestions and increasing the processing speed of the word prediction system 300. As such, the question of whether to include step 702 in routine 510 may be left to a system developer or to the user through a user-definable parameter.

If the ID history expert 316 returned a zero ID history score for the current word, the "YES" branch is followed from step 702 to step 704, in which the word count expert 320 determines whether the current word is found in the static dictionary 304 or the dynamic dictionary 306. If the current word is found in the static dictionary 304 or in the dynamic dictionary 306, the "YES" branch is followed to step 706, in which the word count expert 320 gets the word count for the current word from the dynamic word count array 322.

Step 706 is followed by step 708, in which the word count expert 320 computes a word count score for the current word. For the word value structure shown in Table 1, for instance, the word count score is equal to $2^{20}$ times the word count. This ID history score has been selected to set bit numbers 20–27 in the word value 330 for the current word. Thus, the word value 330 is configured to accommodate word count values up to eight bits. However, a word count having a smaller number of bits may be desirable increase the processing speed of the word prediction system 300. For example, to the word count may be a one bit value if maximum processing speed is desired. Step 708 is followed by the "END" step 712, which returns to step 512 shown on FIG. 5.

Referring again to step 704, if the current word is not found in the static or dynamic dictionary, the "NO" branch is followed from to step 710, in which the word count expert 320 returns a word count score indicating no previous occurrences of the word. For example, the word count expert 320 may return a word count score equal to zero in this case. Step 710 is followed by the return step 712, which returns to step 512 shown on FIG. 5.

Operation of the Static Model Expert

Figure 8:
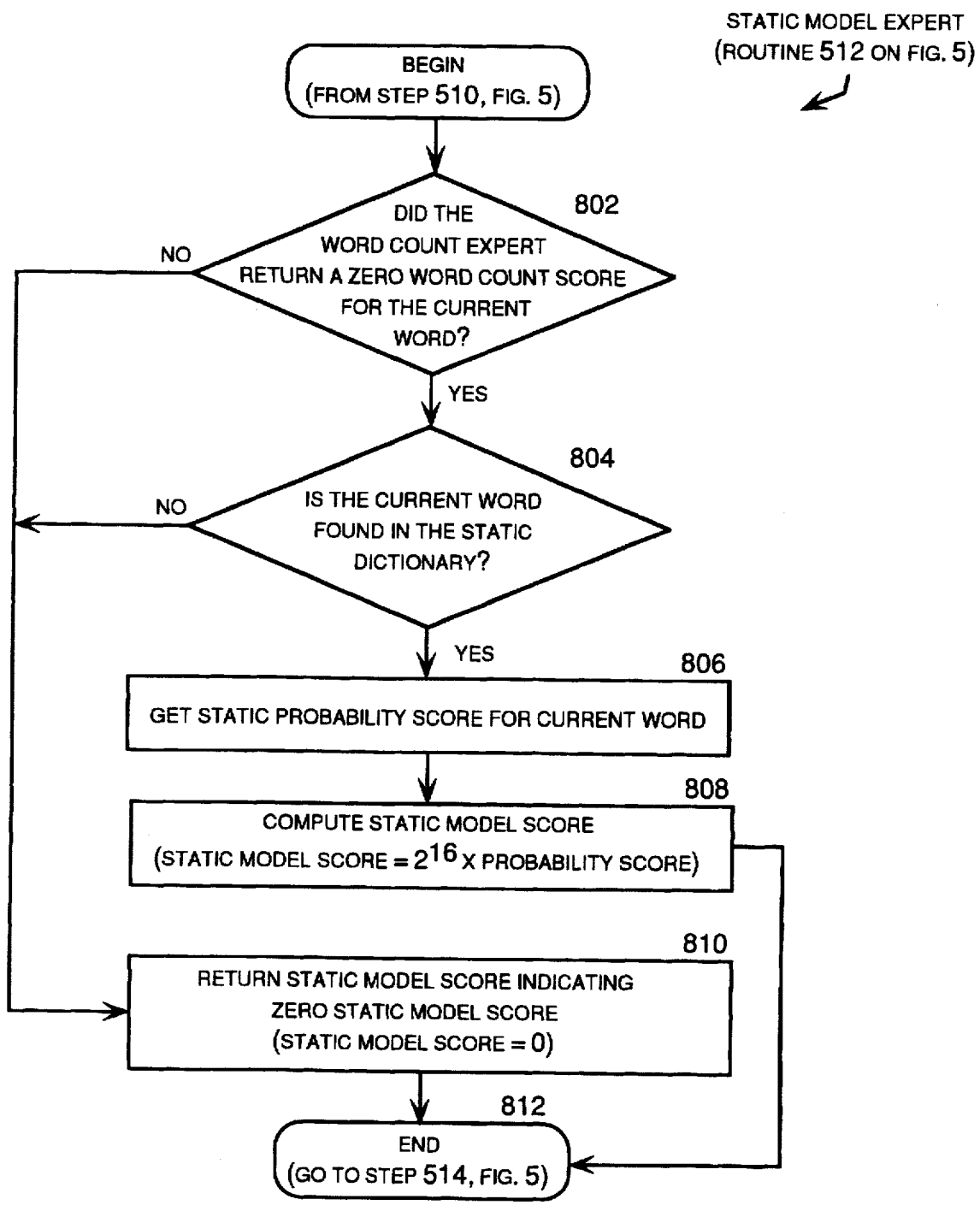
FIG. 8 is a logic flow diagram illustrating the operation of a static model word prediction expert in accordance with an exemplary embodiment of the present invention.

FIG. 8 is a logic flow diagram illustrating routine 512 for the static model expert 324. Routine 512 begins after step 510 shown on FIG. 5. In step 802, the static model expert 324 determines whether the word count expert 320 returned a zero word count score for the current word. If the word count expert 320 did not return a zero word count score for the current word, the "NO" branch is followed to step 810, in which the static model expert 324 returns a zero static model score for the current word. Step 810 is followed by the "END" step 812, which returns to step 514 shown on FIG. 5.

Step 802 allows the static model expert 324 to be skipped if the word count expert 320 returned a non-zero word count score for the current word. This is because the word count expert 320 is considered a more reliable predictor than the static model expert 324 for words that have a non-zero word count. In other words, step 802 allows the actual word count to override the static probability score for words that have a non-zero word count. Like step 702 in routine 510, step 802 is included in routine 512 to improve the processing speed of the word prediction system 300. Step 802 may be omitted if static probability scores are desired for words that have non-zero word counts. In addition, the question of whether to include step 802 in routine 512 may be left to a system developer or to the user through a user-definable parameter.

If the word count expert 320 returned a zero word count score for the current word, the "YES" branch is followed from step 802 to step 804, in which the static model expert 324 determines whether the current word is found in the static dictionary 304. The dynamic dictionary 306 need not be consulted because the static model expert 324 only contains probability values 326 for the entries in the static model dictionary 304.

The probability value for a particular word is based on the word's frequency of occurrence in a large training corpus. For example, the probability value may be a 2-bit number, which allows four categories for the probability value. In this example, the probability values 326 would group the words in the static dictionary into four categories, which may be conceptualized as "very high frequency," "high frequency," "moderate frequency," and "low frequency." Of course, assigning additional bits to the probability value may allow additional categories to be defined for the probability value. In particular, the word value structure shown in Table 1 assigns four bits 17–20 of the word value to the static model score, which is equal to $2^{16}$ multiplied by the probability value. This static model score has been selected to set bit numbers 17–20 in the word value 330 for the current word. The structure of the word value 330 thus accommodates four-bit probability values.

Step 808 is followed by the "END" step 812, which returns to step 514 shown on FIG. 5. Referring again to step 804, if the current word is not found in the static dictionary, the "NO" branch is followed from step 804 to step 810, in which the static model expert 324 returns a score indicating no static model match for the current word. For example, the static model expert may return a static model score of zero in this case. Step 810 is followed by the "END" step 812, which returns to step 814 shown on FIG. 5.

Operation of the Control ID Expert

Figure 9:
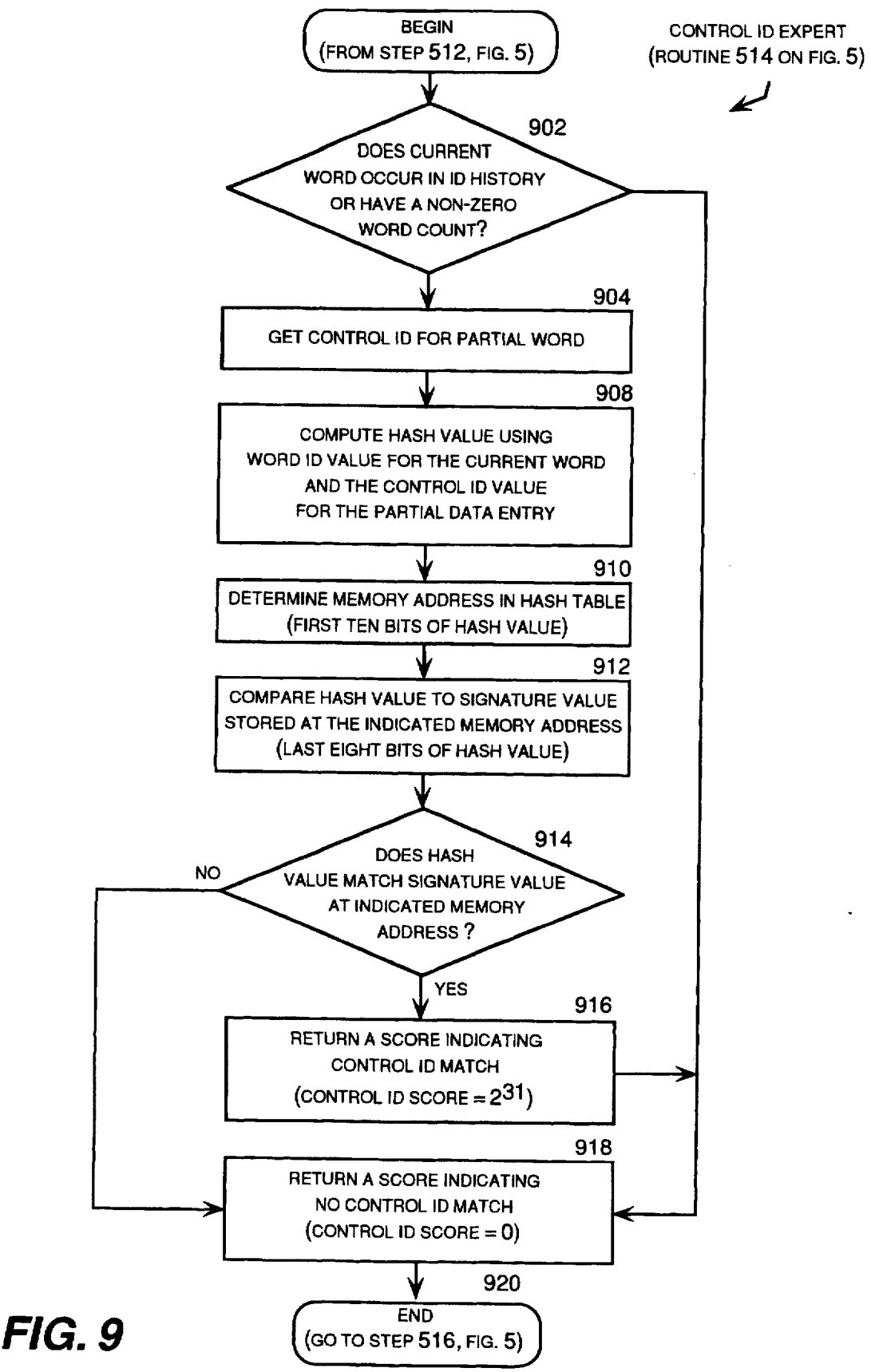
FIG. 9 is a logic flow diagram illustrating the operation of a control ID word prediction expert in accordance with an exemplary embodiment of the present invention.

FIG. 9 is a logic flow diagram illustrating routine 514 for the control ID expert 312. Routine 514 begins after step 514 shown on FIG. 5. The purpose of routine 514 is to determine whether the current word has been previously received in association with the same control ID as the partial data entry 204. The control ID is a value that indicates context-related information regarding the partial data entry 204. For example, a control ID may be assigned to a particular user interface, such as a user interface for composing e-mail messages. Alternatively, a control ID may indicate a particular structured field within a user interface. A first control ID may an e-mail message, "to" field in an e-mail message, for instance, and a second control ID may be assigned to the body of the e-mail message.

The word prediction principle underlying the control ID expert 312 is that a complete word previously entered into a particular user interface control is a likely prediction for a partial data entry having the same prefix as the complete word, if the partial data entry has been entered into the same user interface control. If the complete word has previously be entered into the same user interface control, it will very likely be present in the word ID history 318 or have a non-zero word count 322. Accordingly, if the current word does not occur in the word ID history 318, and does not have a non-zero word count 322, it is unlikely that the current word will have recently occurred in association with the same control ID as the partial data entry.

Therefore, in step 902 the control ID expert 312 determines whether the current word occurs in the word ID history 318 or has a non-zero word count 322. This allows the computation-intensive steps of routine 514 to be avoided for hash values that are most likely not going have a match in the hash table 314. In addition, if the word ID and control ID pair for a current word produces a hash value that has a match in the hash table 314 when the current word does not occur in the word ID history 318 and does not have a non-zero word count 322, than there is a significant risk that the match will likely be the type of erroneous match that occurs with some non-zero probability with this type of hashing technique.

If the current word does not occur in the word ID history 318 or have a non-zero word count 322, the "NO" branch is followed from step 902 to step 918, in which the control ID expert 312 returns a control ID score indicating no control ID match. For example, the control ID expert 312 may return a control ID score equal to zero in this case. Step 918 is followed by the "END" step 920, which returns to step 516 shown on FIG. 5. Like step 702 in routine 510 and step 802 in routine 512, step 902 is included in routine 514 to improve the processing speed of the word prediction system 300. But unlike step 702 in routine 510 and step 802 in routine 512, step 902 also serves to reduce the occurrences of erroneous hash table matches. Nevertheless, step 902 may be omitted if control ID scores are desired for words that do not occur in the word ID history 318 and do not have a non-zero word count 322. In addition, the question of whether to include step 902 in routine 514 may be left to a system developer or to the user through a user-definable parameter.

Referring again to step 902, if the current word occurs in the word ID history 318 or has a non-zero word count 322, the "YES" branch is followed to 904, in which the control ID expert 312 gets the control ID 313 for the partial data entry 204. Step 904 is followed by step 908, in which the control ID expert 312 computes a hash value using the word ID for the current word (i.e., a word from the feasible word list 311) and the control ID 313 for the partial data entry 204. The hash value is a pseudo-random number generated by applying a mathematical manipulation to the word ID for the current word and the control ID 313 for the partial data entry 204.

Step 908 is followed by step 910, in which the control ID expert determines a memory address location, which is preferably defined by the first ten bits of the hash value. Step 910 is followed by step 912, in which the control ID expert 312 compares the signature stored at the memory address to the last eight digits of the hash value, which is a signature for the combination of the word ID for the current word and the control ID 313 for the partial data entry 204. A particular word ID and control ID pair always produces the same hash value, and thus the same signature stored at the same memory address in the hash table 314. Although a different word ID and control ID pair may produce the same hash value, a match in the hash table 314 for a particular word ID and control ID pair is a very good indication that the particular word ID was previously entered into the particular control ID.

Step 912 is followed by step 914, in which the control ID expert 312 determines whether the signature stored at the indicated memory address is the same as the computed signature for the current word. If so, this is an indication that the current word has previously been received in association with the same control ID as the partial data entry 204. If the signature stored at the indicated memory address is the same as the computed signature for the current word, the "YES" branch is followed to the step 916, in which the control ID expert 312 returns a control ID score indicating a control ID match. For the word value structure shown in Table 1, the control ID score may be set to $2^{31}$ to set bit number 31 in the word value 330. This control ID score has been selected to set bit number 31 in the word value 330 for the current word. Step 916 is followed by the "END" step 920, which returns to step 516 shown on FIG. 5.

Referring again to step 914, if the signature stored at the indicated memory address is not the same as the computed signature for the current word, the "NO" branch is followed from step 914 to step 918, in which the control ID expert 312 returns a control ID score indicating no control ID match. For example the control ID score may be equal to zero in this case. Step 918 is followed by step 920, which returns to step 516 shown on FIG. 5.

Updating the Word Prediction System

Figure 10:
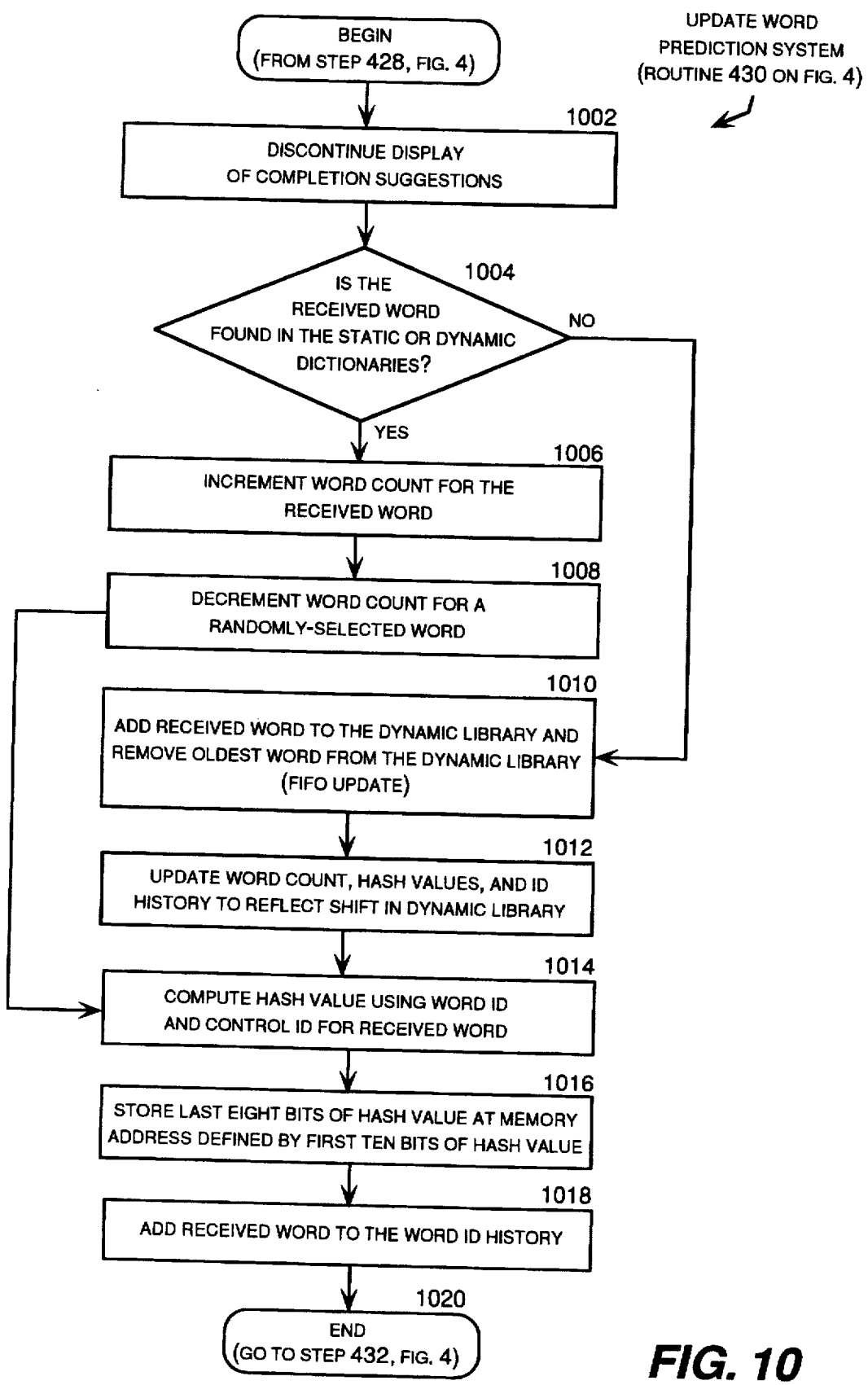
FIG. 10 is a logic flow diagram illustrating a method for updating a word prediction system in accordance with an exemplary embodiment of the present invention.

FIG. 10 is a logic flow diagram illustrating routine 430 for updating the word prediction system 300. Routine 430 is called whenever the text prediction system 200 receives a complete data entry. Routine 430 may therefore follow the "YES" branch from step 404 (user entered a delimiter character to denote a complete data entry), or routine 430 may begin after step 428 (user entered an acceptance command to complete a partial data entry with the additional characters of a completion suggestion), as shown on FIG. 4.

In step 1002, the word prediction system 300 discontinues any previous display of completion suggestions. Step 1002 is followed by step 1004, in which the word completion system 300 determines whether the received word is found within the static dictionary 304 or the dynamic dictionary 306. If the received word is found within the static or dynamic dictionaries, the "YES" branch is followed to step 1006, in which the word prediction system 300 increments the word count 322 for the received word. Step 1006 is followed by step 1008, in which the word prediction system 300 decrements the word count 322 for a randomly-selected word. This prevents the word count array 322 from eventually saturating with maximum word count values.

Referring again to step 1004, if the received word is not found in the static or dynamic dictionaries, the "NO" branch is followed from step 1004 to step 1010, in which the received word is added to the dynamic dictionary 306. Step 1010 is followed by step 1012, in which the word prediction system 300 increments the word IDs for the other words in the dynamic dictionary 306 in the other portions of the word prediction system 300 to reflect the addition of the received word to the dynamic dictionary. That is, word IDs for the words in the dynamic dictionary 306 are incremented in the word ID history 318, the hash table 314, and the dynamic word count 322 to reflect the FIFO shift in word IDs that occurred as a result of adding the current word to the dynamic dictionary 306.

Step 1012 is followed by step 1014, in which the word prediction system 300 computes a hash value using the word ID and the control ID for the received word. Step 1014 is followed by step 1016, in which the word prediction system 300 stores the last eight bits of the hash value as a signature at memory addressed in the hash table 314 defined by the first ten bits of the hash value. Step 1016 is followed by step 1018, in which the word prediction system 300 adds the word ID for the received word to the word ID history 318. Step 1018 is followed by the end step 1020, which returns to step 432 shown on FIG. 4.

Thus, it will be appreciated that the word prediction system 300 updates the hash table 314, the dynamic word count 322, and the word ID history 318 for each complete data entry received by the text prediction system 200. In addition, the received word may be entered into the dynamic dictionary 306 if the received word is not already stored in the dictionary 302.

In view of the foregoing, it will be appreciated that the present invention provides a text completion system that allows the user to complete the partial data entry without having the type the remaining letters of the complete data entry. The invention thus provides a text completion system for use with a miniature computer system having a touch-sensitive display screen and a reduced-size keyboard as primary data entry devices. The invention also provides a text completion system that operates effectively within the restricted processing speed and memory-use characteristics of a miniature computer. The invention also provides an application-independent text completion system that may operate with multiple application programs running on a miniature computer.

The text completion system 200 may include additional functionality, for example allowing the user to request a supplemental set of word predictions for a particular word completion. In this case, the word prediction system 300 may provide a second (i.e., next most likely) prioritized list of word predictions by excluding the word scores equal to and higher than the lowest word score in the first list prioritized list of word predictions. The text completion system 200 may also automatically terminate a call to the word prediction system 300 whenever an new character is received while the word prediction system is processing the call. Many other modifications and additional features will become evident in view of the preceding description of the exemplary embodiments of the invention. It should be understood, therefore, that the foregoing relates only to the exemplary embodiments of the present invention, and that numerous changes may be made therein without departing from the spirit and scope of the invention as defined by the following claims.

The invention claimed is:

1. A computer-readable medium having computer-executable instructions for performing the steps of:
   monitoring the entry of a stream of characters into a data file associated with a program module running on a computer system, the stream of characters defining a plurality of complete data entries followed by a partial data entry;
   displaying the stream of characters on a display screen;
   detecting a pause of a predetermined duration in the entry of the stream of characters; and
   in response to the pause, determining whether the partial data entry satisfies search criteria and, if the partial data entry satisfies the search criteria,
      obtaining a prioritized list of word predictions for the partial data entry from a word prediction system,
      applying display criteria to the prioritized list of word predictions to obtain a prioritized list of completion suggestions, and
      displaying the prioritized list of completion suggestions on the display screen in association with the partial data entry.

2. The computer-readable medium of claim 1, further comprising the steps of:

receiving an acceptance command associated with a particular one of the completion suggestions; and in response to the acceptance command,
completing the partial data entry with characters of the particular completion suggestion, and
discontinuing the display of the prioritized list of completion suggestions.

3. The computer-readable medium of claim 2, before the step of receiving the acceptance command, receiving a selection command associated with the particular completion suggestion.

4. The computer-readable medium of claim 1, wherein the step of determining whether the partial data entry satisfies the search criteria comprises the steps of:

receiving a command establishing a predetermined number of characters; and determining whether the partial data entry comprises at least the predetermined number of characters.

5. The computer-readable medium of claim 1, wherein the step of determining whether the partial data entry satisfies the display criteria comprises the steps of:

receiving a command establishing a predetermined number of additional characters; and determining whether a particular one of the completion suggestions comprises at least the predetermined number of additional characters more than the partial data entry.

6. The computer-readable medium of claim 1, wherein the step of obtaining the prioritized list of word predictions from the word prediction system comprises the steps of:

comparing the partial data entry to the entries in a dictionary to obtain a list of feasible words;

submitting the list of feasible words to a plurality of word prediction experts;

obtaining word predictions from each word prediction expert; and positioning each word prediction in the prioritized list of word predictions based on a computed indication of likelihood of being a correct completion suggestion.

7. The computer-readable medium of claim 6, further comprising the steps of:

associating each entry in the dictionary with a word identification value; and for entries in the list of feasible words,
obtaining a word prediction score from each word prediction expert,
computing a word value based on the word prediction scores and the word identification value, and
positioning the entry in the prioritized list of word predictions based on the word value.

8. The computer-readable medium of claim 7, wherein:

each word prediction expert is associated with a mutually exclusive set of bits within each word value assigned to the word prediction experts to reflect a priority order among the word prediction experts; and each word value is computed by summing the word prediction scores associated with a particular one of the word predictions with a word identification value for the particular word prediction.

9. The computer-readable medium of claim 6, wherein the step of submitting the list of feasible words to the word prediction experts comprises the steps of submitting the list of feasible words to a first one of the word prediction experts, and within the first word prediction expert:

comparing the list of feasible words to a list of recently received words to determine whether a particular feasible word appears in the list of recently received words;

if the particular feasible word appears in the list of recently received words, determining whether the complete data entry immediately preceding the partial data entry in the stream of characters corresponds to the data entry immediately preceding the particular feasible word in the list of recently received words; and if the complete data entry immediately preceding the partial data entry in the stream of characters corresponds to the data entry immediately preceding the particular feasible word in the list of recently received words, determining whether the two complete data entries immediately preceding the partial data entry in the stream of characters corresponds to the two data entries immediately preceding the particular feasible word in the list of recently received words.

10. The computer-readable medium of claim 9, wherein the step of submitting the list of feasible words to the word prediction experts comprises the steps of submitting the list of feasible words to a second one of the word prediction experts, and within the second word prediction expert:

comparing the list of feasible words to a list of entries in the dictionary including a word count for each dictionary entry, the word count for a particular dictionary entry indicating the historical frequency of the occurrence of the particular dictionary entry in the word prediction system.

11. The computer-readable medium of claim 10, wherein the step of submitting the list of feasible words to the word prediction experts comprises the steps of submitting the list of feasible words to a third one of the word prediction experts, and within the third word prediction expert:

comparing the list of feasible words to a list of entries in the dictionary including a probability score for each dictionary entry, the probability score for a particular dictionary entry indicating the frequency of the occurrence of the particular dictionary entry in a training corpus.

12. The computer-readable medium of claim 11, wherein the step of submitting the list of feasible words to the word prediction experts comprises the steps of submitting the list of feasible words to a fourth word prediction expert, and within the fourth word prediction expert:

identifying a context parameter associated with the partial data entry; and determining whether an entry in the list of feasible words has previously occurred in the word prediction system in association with the context parameter.

13. The computer-readable medium of claim 12, wherein the context parameter is indicative of a user interface associated with a program module.

14. The computer-readable medium of claim 12, wherein the context parameter is indicative of a structured field within a user interface associated with a program module.

15. The computer-readable medium of claim 12, wherein the step of determining whether the entry in the list of feasible words has previously occurred in the word prediction system in association with the context parameter further comprises the steps of:

computing a hash value based on the context parameter and a word identification value associated with the entry in the list of feasible words;

identifying a memory address based on the hash value;

retrieving a stored value from the memory address; and determining whether the stored value corresponds to a signature value based on the hash value.

16. The computer-readable medium of claim 1, further comprising the steps of:

receiving a delimiter character converting the partial data entry into a complete data entry; and in response to the delimiter character,
updating the word prediction system for the complete data entry, and
discontinuing the display of the prioritized list of completion suggestions.

17. The computer-readable medium of claim 16, wherein the step of updating the word prediction system further comprises the steps of:

determining whether the complete data entry corresponds to a first entry in a dictionary; and if the complete data entry corresponds to the first entry in the dictionary,
incrementing a first word count value associated with the first entry in the dictionary,
randomly selecting a second entry in the dictionary, and decrementing a second word count value associated with the second entry in the dictionary.

18. The computer-readable medium of claim 16, wherein the step of updating the word prediction system further comprises the steps of:

determining whether the complete data entry corresponds to an entry in a dictionary; and if the complete data entry does not correspond to an entry in the dictionary,
adding the complete data entry to the dictionary, and deleting another data entry from the dictionary.

19. The computer-readable medium of claim 16, wherein the step of updating the word prediction system further comprises the step of adding the complete data entry to a list of recently received words.

20. The computer-readable medium of claim 16, wherein the step of updating the word prediction system further comprises the steps of:

identifying a context parameter associated with the partial data entry;

computing a hash value based on the context parameter and a word identification value associated with the entry in the list of feasible words;

identifying a memory address based on the hash value; and storing a signature value based on the hash value at the memory address.

21. In a computer system, a word prediction system configured to implement a method for obtaining a prioritized list of word predictions for a partial data entry, comprising the steps of:

receiving a partial data entry;

comparing the partial data entry to the entries in a dictionary to obtain a list of feasible words;

submitting the list of feasible words to a plurality of word prediction experts;

obtaining a word prediction from each word prediction expert; and positioning each word prediction in the prioritized list of word predictions based on a computed indication of likelihood of being a correct completion suggestion.

22. The word prediction system of claim 21, wherein:

each word prediction expert is associated with a mutually exclusive set of bits within each word value assigned to the word prediction experts to reflect a priority order among the word prediction experts; and each word value is computed by summing the word prediction scores associated with a particular one of the word predictions with a word identification value for the particular word prediction.

23. The word prediction system of claim 22, wherein the step of submitting the list of feasible words to the word prediction experts comprises the steps of submitting the list of feasible words to a first one of the word prediction experts, and within the first word prediction expert:

comparing the list of feasible words to a list of recently received words to determine whether a particular one of the feasible words appears in the list of recently received words;

if the particular feasible word appears in the list of recently received words, determining whether the complete data entry immediately preceding the partial data entry in the stream of characters corresponds to the data entry immediately preceding the particular feasible word in the list of recently received words; and if the complete data entry immediately preceding the partial data entry in the stream of characters corresponds to the data entry immediately preceding the particular feasible word in the list of recently received words, determining whether the two complete data entries immediately preceding the partial data entry in the stream of characters corresponds to the two data entries immediately preceding the particular feasible word in the list of recently received words.

24. The word prediction system of claim 21, wherein the step of submitting the list of feasible words to the word prediction experts comprises the steps of submitting the list of feasible words to a second one of the word prediction experts, and within the second word prediction expert:

comparing the list of feasible words to a list of entries in the dictionary including a word count for each dictionary entry, the word count for a particular dictionary entry indicating the historical frequency of the occurrence of the particular dictionary entry in the word prediction system.

25. The word prediction system of claim 21, wherein the step of submitting the list of feasible words to the word prediction experts comprises the steps of submitting the list of feasible words to a third one of the word prediction experts, and within the third word prediction expert:

comparing the list of feasible words to a list of entries in the dictionary including a probability score for each dictionary entry, the probability score for a particular dictionary entry indicating the frequency of the occurrence of the particular dictionary entry in a training corpus.

26. The word prediction system of claim 21, wherein the step of submitting the list of feasible words to the word prediction experts comprises the steps of submitting the list of feasible words to a fourth one of the word prediction experts, and within the fourth word prediction expert:

identifying a context parameter associated with the partial data entry; and determining whether an entry in the list of feasible words has previously occurred in the word prediction system in association with the context parameter.

27. The word prediction system of claim 26, wherein the context parameter is indicative of a particular user interface associated with a particular program module.

28. The word prediction system of claim 27, wherein the context parameter is indicative of a particular structured field within a particular user interface associated with a particular program module.

29. The word prediction system of claim 27, wherein the step of determining whether the entry in the list of feasible words has previously occurred in the word prediction system in association with the context parameter further comprises the steps of:
- computing a hash value based on the context parameter and a word identification value associated with the entry in the list of feasible words;
- identifying a memory address based on the hash value;
- retrieving a stored value from the memory address; and
- determining whether the stored value corresponds to a signature value based on the hash value.

30. The word prediction system of claim 21, further comprising the steps of:
- receiving a complete data entry; and
- in response to the complete data entry, updating the word prediction system for the complete data entry.

31. The word prediction system of claim 30, wherein the step of updating the word prediction system further comprises the steps of:
- determining whether the complete data entry corresponds to a first entry in the dictionary; and
- if the complete data entry corresponds to the first entry in the dictionary,
  - incrementing a first word count value associated with the first entry in the dictionary,
  - randomly selecting a second entry in the dictionary, and
  - decrementing a second word count value associated with the second entry in the dictionary.

32. The word prediction system of claim 31, wherein the step of updating the word prediction system further comprises the steps of:
- determining whether the complete data entry corresponds to an entry in the dictionary; and
- if the complete data entry does not correspond to an entry in the dictionary,
  - adding the complete data entry to the dictionary, and
  - deleting another data entry from the dictionary.

33. The word prediction system of claim 31, wherein the step of updating the word prediction system further comprises the step of adding the complete data entry to a list of recently received words.

34. The word prediction system of claim 31, wherein the step of updating the word prediction system further comprises the steps of:
- identifying a context parameter associated with the partial data entry;
- computing a hash value based on the context parameter and a word identification value associated with the entry in the list of feasible words;
- identifying a memory address based on the hash value; and
- storing a signature value based on the hash value at the memory address.

35. In a computer system, a word prediction system for producing a prioritized list of word predictions for a partial data entry, comprising:
- a dictionary comprising a plurality of static dictionary entries and a plurality of dynamic dictionary values, each static dictionary entry having a word associated with a unique word identification value;
- a word count value associated with each dictionary entry indicating the historical frequency of the occurrence of the particular dictionary entry in the word prediction system;
- a probability score associated with each static dictionary entry indicating the frequency of the occurrence of the particular dictionary entry in a training corpus;
- an array of word identification values corresponding to a list of recently received words in the order in which the words were received by the word prediction system; and
- an array of signature values based on hash values, each hash value stored at a memory address based on the corresponding hash value, each hash value computed based on a word identification value and a context parameter associated with the partial data entry.

* * * * *